(12) United States Patent
Oner et al.

(10) Patent No.: US 6,981,074 B2
(45) Date of Patent: Dec. 27, 2005

(54) DESCRIPTOR-BASED LOAD BALANCING

(75) Inventors: Koray Oner, Sunnyvale, CA (US); Jeremy Dion, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 228 days.

(21) Appl. No.: 10/684,614

(22) Filed: Oct. 14, 2003

(65) Prior Publication Data

US 2005/0080952 A1    Apr. 14, 2005

(51) Int. Cl.[7] .................. G06F 13/14; G06F 13/00; G06F 13/28; G06F 15/16; H04L 12/66
(52) U.S. Cl. .................. 710/32; 710/1; 710/20; 710/21; 710/22; 710/35; 710/308; 710/33; 718/100; 718/101; 718/105; 709/201; 709/212; 709/213; 709/238; 709/250; 712/28; 712/29; 712/30; 712/32; 370/351; 370/352; 370/218
(58) Field of Search .................. 710/1, 5, 20, 21, 710/22–28, 32, 33, 34, 35, 308; 718/100, 718/101, 102, 105; 709/201, 212, 213, 238, 709/250; 712/28, 29, 30, 32; 370/351, 352, 370/218

(56) References Cited

U.S. PATENT DOCUMENTS

| | | | |
|---|---|---|---|
| 5,533,203 A * | 7/1996 | Fischer et al. | 710/52 |
| 5,745,790 A * | 4/1998 | Oskouy | 710/33 |
| 5,974,518 A * | 10/1999 | Nogradi | 711/173 |
| 6,092,116 A * | 7/2000 | Earnest et al. | 709/236 |
| 6,145,016 A * | 11/2000 | Lai et al. | 710/4 |
| 6,182,165 B1 * | 1/2001 | Spilo | 710/22 |
| 6,185,633 B1 * | 2/2001 | Johnson | 710/22 |
| 6,480,489 B1 * | 11/2002 | Muller et al. | 370/389 |
| 6,691,178 B1 * | 2/2004 | Kasper | 710/22 |
| 6,714,553 B1 * | 3/2004 | Poole et al. | 370/412 |
| 6,748,479 B2 * | 6/2004 | Sano et al. | 710/316 |
| 6,857,030 B2 * | 2/2005 | Webber | 710/33 |
| 6,895,457 B2 * | 5/2005 | Wolrich et al. | 710/100 |
| 6,912,602 B2 * | 6/2005 | Sano et al. | 710/22 |
| 2003/0095559 A1 * | 5/2003 | Sano et al. | 370/419 |
| 2003/0097467 A1 * | 5/2003 | Sano | 709/238 |
| 2003/0105828 A1 * | 6/2003 | Sano et al. | 709/212 |
| 2004/0024920 A1 * | 2/2004 | Gulick et al. | 710/1 |
| 2004/0030712 A1 * | 2/2004 | Sano et al. | 707/102 |
| 2004/0260829 A1 * | 12/2004 | Husak et al. | 709/232 |
| 2005/0027901 A1 * | 2/2005 | Simon et al. | 710/22 |
| 2005/0060443 A1 * | 3/2005 | Rosner | 710/33 |

* cited by examiner

Primary Examiner—Kim Huynh
Assistant Examiner—Tanh Q. Nguyen
(74) Attorney, Agent, or Firm—Garlick, Harrison & Markison LLP; Bruce Garlick

(57) ABSTRACT

A multiprocessor switching device substantially implemented on a single CMOS integrated circuit is described in connection with a descriptor-based packet processing mechanism for use in efficiently assigning and processing packets to a plurality of processors. A plurality of descriptors associated with each packet transfer are written back to memory in order, divided into subset groups and assigned to processors, where each processor searches the assigned subset for EOP and associated SOP descriptors to process.

23 Claims, 10 Drawing Sheets

| | Hardware Bit | SOP Bit | EOP Bit | Memory | Packets Received | Processors Assigned | Working |
|---|---|---|---|---|---|---|---|
| 900 | 0 | 0 | 0 | IQ Descriptor | | | |
| 901 | 0 | 0 | 0 | IQ Descriptor | | | |
| 902 | 1 | 1 | 0 | IQ Descriptor | Packet 0 | CPU0 | CPU0 |
| 903 | 1 | 0 | 1 | IQ Descriptor | | CPU0 | CPU0 |
| 904 | 1 | 1 | 0 | IQ Descriptor | Packet 1 | CPU0 | CPU0 |
| 905 | 1 | 0 | 1 | IQ Descriptor | | CPU0 | CPU0 |
| 906 | 1 | 1 | 0 | IQ Descriptor | Packet 2 | CPU1 | CPU1 |
| 907 | 1 | 0 | 0 | IQ Descriptor | | CPU1 | CPU1 |
| 908 | 1 | 0 | 1 | IQ Descriptor | | CPU1 | CPU1 |
| 909 | 1 | 1 | 0 | IQ Descriptor | Packet 3 | CPU1 | CPU2 |
| 910 | 1 | 0 | 0 | IQ Descriptor | | CPU2 | CPU2 |
| 911 | 1 | 0 | 0 | IQ Descriptor | | CPU2 | CPU2 |
| 912 | 1 | 1 | 1 | IQ Descriptor | Packet 4 | CPU2 | CPU2 |
| 913 | 1 | 1 | 0 | IQ Descriptor | Packet 5 | CPU2 | CPU3 |
| 914 | 1 | 0 | 1 | IQ Descriptor | | CPU3 | CPU3 |
| 915 | 1 | 1 | 1 | IQ Descriptor | Packet 6 | CPU3 | CPU3 |
| 916 | 1 | 1 | 0 | IQ Descriptor | Packet 7 | CPU3 | |
| 917 | 1 | 0 | 0 | IQ Descriptor | | CPU3 | |
| 918 | 0 | 0 | 0 | IQ Descriptor | | | |
| 919 | 0 | 0 | 0 | IQ Descriptor | | | |
| 920 | 0 | 0 | 0 | IQ Descriptor | | | |

Finished Descriptors

| | Hardware Bit | SOP Bit | EOP Bit | Memory | Packets Received | Processors Assigned | Working |
|---|---|---|---|---|---|---|---|
| 900 | 0 | 0 | 0 | IQ Descriptor | | | |
| 901 | 0 | 0 | 0 | IQ Descriptor | | | |
| 902 | 1 | 1 | 0 | IQ Descriptor | Packet 0 | CPU0 | CPU0 |
| 903 | 1 | 0 | 1 | IQ Descriptor | | CPU0 | CPU0 |
| 904 | 1 | 1 | 0 | IQ Descriptor | Packet 1 | CPU0 | CPU0 |
| 905 | 1 | 0 | 1 | IQ Descriptor | | CPU0 | CPU0 |
| 906 | 1 | 1 | 0 | IQ Descriptor | Packet 2 | CPU1 | CPU1 |
| 907 | 1 | 0 | 0 | IQ Descriptor | | CPU1 | CPU1 |
| 908 | 1 | 0 | 1 | IQ Descriptor | | CPU1 | CPU1 |
| 909 | 1 | 1 | 0 | IQ Descriptor | Packet 3 | CPU1 | CPU2 |
| 910 | 1 | 0 | 0 | IQ Descriptor | | CPU2 | CPU2 |
| 911 | 1 | 0 | 0 | IQ Descriptor | | CPU2 | CPU2 |
| 912 | 1 | 1 | 1 | IQ Descriptor | Packet 4 | CPU2 | CPU2 |
| 913 | 1 | 1 | 0 | IQ Descriptor | Packet 5 | CPU2 | CPU3 |
| 914 | 1 | 0 | 1 | IQ Descriptor | | CPU3 | CPU3 |
| 915 | 1 | 1 | 1 | IQ Descriptor | Packet 6 | CPU3 | CPU3 |
| 916 | 1 | 1 | 0 | IQ Descriptor | Packet 7 | CPU3 | |
| 917 | 1 | 0 | 0 | IQ Descriptor | | CPU3 | |
| 918 | 0 | 0 | 0 | IQ Descriptor | | | |
| 919 | 0 | 0 | 0 | IQ Descriptor | | | |
| 920 | 0 | 0 | 0 | IQ Descriptor | | | |

Rows 902–917 are bracketed as Finished Descriptors.

*Figure 9*

DESCRIPTOR-BASED LOAD BALANCING

RELATED APPLICATIONS

This application is related to U.S. Provisional Patent Application Ser. No. 60/380,740, filed May 15, 2002; U.S. Provisional Patent Application Ser. No. 60/331,789, filed Nov. 20, 2001; U.S. Provisional Patent Application Ser. No. 60/344,713, filed Dec. 24, 2001; U.S. Provisional Patent Application Ser. No. 60/348,777, filed Jan. 14, 2002, U.S. Provisional Patent Application Ser. No. 60/348,717, filed Jan. 14, 2002, U.S. patent application Ser. No. 10/270,016, filed Oct. 11, 2002 and U.S. patent application Ser. No. 10/269,666, filed Oct. 11, 2002, each of which is incorporated herein by reference in its entirety.

BACKGROUND OF THE INVENTION

1. Field of the Invention

The present invention is directed in general to data communications. In one aspect, the present invention relates to a method and system for improving descriptor based packet processing in microprocessor or multiprocessor computer devices.

2. Related Art

As is known, communication technologies that link electronic devices may route and process signal information in the networked computer and electronic systems. Where packets are used to communicate among the linked devices, each networked system must receive and transmit packets, and must process the packets directed to that system to determine what is being transmitted to that system. Some communication technologies interface a one or more processor devices for processing packet-based signals in a network of computer systems. While a device or group of devices having a large amount of memory and significant processing resources may be capable of performing a large number of tasks, significant operational difficulties exist in coordinating the operation of multiprocessors to process the packet transfer operations.

For example, in linked computer systems that include one or more interfaces or ports on which packets are transmitted and received, each interface generally includes a dedicated DMA engine used to transmit received packets to memory in the system and to read packets from the memory for transmission. If a given system includes two or more packet interfaces, the system includes DMA engines for each interface. Where a multiprocessor computer system processes multiple packet channels using the DMA engines, the processor(s) in the system must be able to efficiently process the DMA transfers for each channel by distributing the transfers amongst the processors for handling.

In conventional multiprocessor systems that use descriptors for DMA transfers, software prepares descriptors in the memory and informs the DMA engine by updating a count register by the number of descriptors it has prepared. The DMA engine reads these descriptors to execute the data transfer specified in the descriptors. When the DMA engine is done processing the descriptors, the DMA engine typically writes back to memory the first descriptor (i.e., the descriptor identifying the start of the packet to be transferred) from a sequence of one or more descriptors for a given DMA packet transfer. In such systems, the processor executing the software does not know how many descriptors are used for the packet transfer by reading the first descriptor. In addition, when only the first descriptor is written back, the processor can not snoop the other released descriptors. As a result, only one processor can work on packet processing of one channel, and therefore load balancing between several processors can not be implemented unless this processor works as a load distributor, in which case full multiprocessor functionality is not realized. Finally, conventional descriptor-based DMA transfers have a limited packet length if the maximum packet length is restricted to the length of the packet length field in the first descriptor.

Therefore, a need exists for methods and/or apparatuses for improving the processing of descriptor-based packet transfers to quickly and efficiently write packets of data to memory, and to so in a way that quickly and efficiently provides for load balancing among the processor(s). Further limitations and disadvantages of conventional systems will become apparent to one of skill in the art after reviewing the remainder of the present application with reference to the drawings and detailed description which follow.

SUMMARY OF THE INVENTION

In accordance with the present invention, an integrated circuit system and method are provided for efficiently processing packets with multiple processors using an improved descriptor structure by providing additional descriptor fields specifying descriptor ownership and whether the descriptor is for the start or end of the packet. By including these additional descriptor fields in all of the descriptors that are written back to memory, packet processing of a channel can be efficiently and quickly distributed between several processors.

In a selected embodiment, an integrated circuit multiprocessor is provided for processing data packets on multiple processors. An interface circuit receives data packets that are to be stored in memory under control of a descriptors processed by a packet manager. The descriptors may be stored in memory in the form of a descriptor ring, with each descriptor identifying a buffer in memory where at least a portion of a data packet is to be stored. Each descriptor includes an ownership indication, a SOP indication, an EOP indication, a buffer length value and a buffer address for specifying a location in memory for storing at least a portion of a data packet. The packet manager controls the transfer of a first data packet using at least a first descriptor once the ownership indication in the descriptor is set. The packet manager also controls the transfer of a second data packet using at least a second descriptor. An improved load balancing system is obtained by having the packet manager, upon completion of the memory transfer, write back to memory all descriptors associated with a data packet upon completion of the transfer of the data packet whereby each descriptor is written back in the order in which it is released by the packet manager and has its ownership indication reset. In addition, when a descriptor has its SOP indication set, the descriptor is a start descriptor that identifies a memory buffer for storing the beginning portion of data packet. When a descriptor has its EOP indication set, the descriptor is a last descriptor that identifies a memory buffer for storing the ending portion of data packet. When a descriptor has its SOP and EOP indications reset, the descriptor is a middle descriptor that identifies a memory buffer for storing a middle portion of data packet. When both the SOP and EOP indications are set, the descriptor identifies a memory buffer for storing an entire data packet.

In a selected embodiment, a load balancing processor distributes data packets to multiple processors by assigning a first consecutive group of descriptors to a first processor. The load balancing processor also assigns a second consecutive group of descriptors to a second processor. Each processor is configured to snoop on the last descriptor in its assigned group of descriptors to detect when the last descriptor has its ownership indication reset by the packet manager. Each processor then claims a data packet for processing by scanning back through the assigned group of descriptors (starting with the last descriptor having its ownership indication reset) to identify any descriptor having an EOP indication set, and then scanning back further through the group of descriptors to identify any start descriptor having a SOP indication set. For each identified last descriptor having its EOP indication set, the processor claims that descriptor (along with all preceding descriptors up to and including the associated start descriptor) as a data packet to be processed by the processor.

In an alternate selected embodiment, a system for controlling distribution of data packets to processors is disclosed. In the system, a plurality of consecutive descriptor entries configured in a descriptor ring are read by a DMA controller, which stores data packets in memory buffers using each descriptor entry to specify a memory location for storing at least a portion of a data packet. Once the packet portion is stored in memory, the corresponding descriptor is released to software so that consecutive descriptor entries are released in order upon completing storage of a data packet. A first group of consecutive descriptors is assigned to a first processor and a second group of consecutive descriptors is assigned to a second processor. As a result, each processor spins on the final descriptor in its assigned group of descriptors and processes any packet comprising any EOP descriptors contained with its assigned group of descriptors along with any other descriptors associated with each EOP descriptor. For example, the descriptors associated with an EOP descriptor may be determined by scanning back through the assigned group of descriptors to identify an SOP descriptor, or may be determined by scanning back through the plurality of consecutive descriptor entries to identify an SOP descriptor if said an SOP descriptor is not included in the assigned group of descriptors for the processor. With this system, each processor determines the length of an assigned packet by summing the buffer length values for each descriptor associated with the assigned packet so as to support an unlimited packet size.

In another selected embodiment, a load balancing method is provided for distributing packets among multiple processors by allocating descriptors associated with each packet. As an initial step, a plurality of descriptors (including a first descriptor group and a second descriptor group) are created and released to a packet manager. In addition, a first subset of the plurality of descriptors is assigned to a first processor and a second subset of the plurality of descriptors is assigned to a second processor. First and second packets are received at an interface circuit and transferred to memory under control of the first and second descriptor groups. After transferring the packets, the first and second descriptor groups are released to software. Each processor then identifies any EOP descriptor in its assigned subset of the plurality of descriptors along with any other descriptor associated with said EOP descriptor, and then processes said descriptors as an assigned packet for that processor. For example, to identify an EOP descriptor in the assigned subset of descriptors, each processor may snoop on a last descriptor from the assigned subset of descriptors and scan back through said assigned subset to identify any EOP descriptor and any descriptor associated with said EOP descriptor, which could include a separate SOP descriptor or might be only the identified EOP descriptor if the EOP descriptor has both its SOP bit and EOP bit set.

The objects, advantages and other novel features of the present invention will be apparent from the following detailed description when read in conjunction with the appended claims and attached drawings.

BRIEF DESCRIPTION OF THE DRAWINGS

FIG. 9 illustrates how a group of descriptors are distributed among four processors to implement load balancing in accordance with a selected embodiment of the present invention.

DETAILED DESCRIPTION

Figure 1:
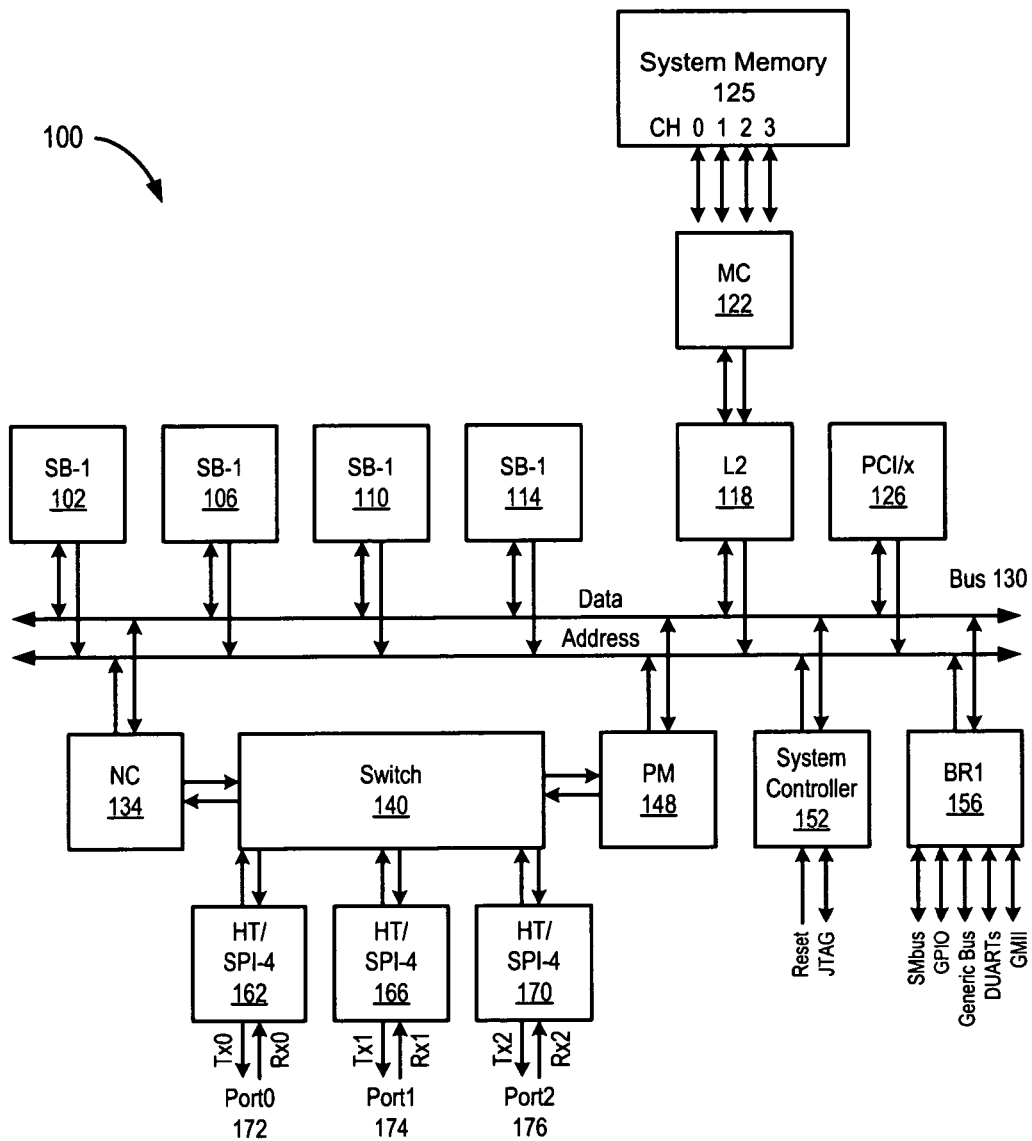
FIG. 1 shows a block diagram of a network multiprocessor switching system-on-a-chip.

An apparatus and method in accordance with the present invention provide a system for routing incoming packets through a multiprocessor switching system-on-a-chip. A system level description of the operation of an embodiment of the multiprocessor switching system of the present invention is shown in FIG. 1 which depicts a schematic block diagram of a multiprocessor device 100 in accordance with the present invention. The multiprocessor device 100 may be an integrated circuit or it may be constructed from discrete components. The multiprocessor device 100 includes a plurality of processing units 102, 106, 110, 114, cache memory 118, memory controller 122, which interfaces with on and/or off-chip system memory 125, an internal bus 130, a node controller 134, a switching module 140, a packet manager 148, a system controller 152 and a plurality of configurable packet based interfaces 162, 166, 170, such as three flexible HyperTransport/SPI-4 Phase 2 links.

As shown in FIG. 1, the four processors 102, 106, 110, 114 are joined to the internal bus 130. When implemented as standard MIPS64 cores, the processors 102, 106, 110, 114 have floating-point support, and are independent, allowing applications to be migrated from one processor to another if necessary. The processors 102, 106, 110, 114 may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 100 may include any number of processors (e.g., as few as one processor, two processors, four processors, etc.). In addition, each processing unit 102, 106, 110, 114 may include a memory sub-system (level 1 cache) of an instruction cache and a data cache and may support separately, or in combination, one or more processing functions. With respect to the processing system example of FIG. 2, each processing unit 102, 106, 110, 114 may be a destination within multiprocessor device 100 and/or each processing function executed by the processing modules 102, 106, 110, 114 may be a source within the processor device 100.

The internal bus 130 may be any form of communication medium between the devices coupled to the bus. For example, the bus 130 may include shared buses, crossbar connections, point-to-point connections in a ring, star, or any other topology, meshes, cubes, etc. In selected embodiments, the internal bus 130 may be a split transaction bus (i.e., having separate address and data phases). The data phases of various transactions on the bus may proceed out of order with the address phases. The bus may also support coherency and thus may include a response phase to transmit coherency response information. The bus may employ a distributed arbitration scheme, and may be pipelined. The bus may employ any suitable signaling technique. For example, differential signaling may be used for high speed signal transmission. Other embodiments may employ any other signaling technique (e.g., TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired. In addition, the internal bus 130 may be a high-speed (e.g., 128-Gbit/s) 256 bit cache line wide split transaction cache coherent multiprocessor bus that couples the processing units 102, 106, 110, 114, cache memory 118, memory controller 122 (illustrated for architecture purposes as being connected through cache memory 118), node controller 134 and packet manager 148 together. The bus 130 may run in big-endian and little-endian modes, and may implement the standard MESI protocol to ensure coherency between the four CPUs, their level 1 caches, and the shared level 2 cache 118. In addition, the bus 130 may be implemented to support all on-chip peripherals, including a PCI/PCI-X interface 126 and the input/output bridge interface 156 for the generic bus, SMbus, UARTs, GOP and Ethernet MAC.

The cache memory 118 may function as an L2 cache for the processing units 102, 106, 110, 114, node controller 134 and/or packet manager 148. With respect to the processing system example of FIG. 2, the cache memory 118 may be a destination within multiprocessor device 100.

The memory controller 122 provides an interface to system memory, which, when the multiprocessor device 100 is an integrated circuit, may be off-chip and/or on-chip. With respect to the processing system example of FIG. 2, the system memory may be a destination within the multiprocessor device 100 and/or memory locations within the system memory may be individual destinations within the device 100 (as illustrated with channels 0–3). Accordingly, the system memory may include one or more destinations for the multi-node processing systems. The memory controller 122 is configured to access the system memory in response to read and write commands received on the bus 130. The L2 cache 118 may be coupled to the bus 130 for caching various blocks from the system memory for more rapid access by agents coupled to the bus 130. In such embodiments, the memory controller 122 may receive a hit signal from the L2 cache 118, and if a hit is detected in the L2 cache for a given read/write command, the memory controller 122 may not respond to that command. Generally, a read command causes a transfer of data from the system memory (although some read commands may be serviced from a cache such as an L2 cache or a cache in the processors 102, 106, 110, 114) and a write command causes a transfer of data to the system memory (although some write commands may be serviced in a cache, similar to reads). The memory controller 122 may be designed to access any of a variety of types of memory. For example, the memory controller 122 may be designed for synchronous dynamic random access memory (SDRAM), and more particularly double data rate (DDR) SDRAM. Alternatively, the memory controller 122 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The node controller 134 functions as a bridge between the internal bus 130 and the configurable packet-based interfaces 162, 166, 170. Accordingly, accesses originated on either side of the node controller will be translated and sent on to the other. The node controller also supports the distributed shared memory model associated with the cache coherency non-uniform memory access (CC-NUMA) protocol.

The packet manager 148 circuitry communicates packets between the interfaces 162, 166, 170 and the system memory, and may be a direct memory access (DMA) engine that writes packets received from the switching module 140 into input queues of the system memory and reads packets from output queues of the system memory to the appropriate configurable packet-based interface 162, 166, 170. The packet manager 148 may include a packet manager input and a packet manager output, each having its own DMA engine and associated cache memory. The cache memory may be arranged as first-in-first-out (FIFO) buffers that respectively support the input queues and output queues.

The packet manager circuit 148 comprises circuitry shared by the interfaces 162, 166, 170. The packet manager may generate write commands to the memory controller 122 to write received packets to the system memory, and may generate read commands to read packets from the system memory for transmission by one of the interfaces 162, 166, 170. In some embodiments, the packet manager 148 may be a more efficient use of hardware than having individual DMA engines for each of the interfaces 162, 166, 170. Additionally, the packet manager may simplify communication on the bus 130, in some embodiments, for packet data transfers. It is noted that, in some embodiments, the system 100 may include an L2 cache coupled to the bus 130. The packet manager 148 may be configured, in some embodiments, to cause a portion of the packet data to be stored into the L2 cache in addition to being stored in memory. In some embodiments, the packet manager 148 may use descriptors to locate the memory locations for reading and writing packet data. The descriptors may be stored in the L2 cache or in main memory. The packet manager 148 may read and write the descriptors as well.

In some embodiments, the interfaces 162, 166, 170 may have dedicated communication paths to the node controller 134 or packet manager 148. However, in the illustrated embodiment, the system 100 employs a switch 140. The switch 140 may selectively couple one of the receive/transmit interfaces 162, 166, 170 to the node controller 134 or packet manager 148 to transfer received data. The switch 140 may selectively couple the packet manager 148 to one of the interfaces 162, 166, 170 to transfer packet data from the packet manager 148 to the interfaces 162, 166, 170 for transmission on the corresponding ports 172, 174, 176. The switch 140 may have request/grant interfaces to each of the interfaces 162, 166, 170 and the packet manager 148 for requesting transfers and granting those transfers. As will be appreciated, a receive/transmit interface includes any circuitry configured to communicate on a port according to the protocol defined for the port. The interface may include receive circuitry configured to receive communications on the port and to transmit the received communications to other circuitry internal to the system that includes the interface. The interface may also include transmit circuitry configured to receive communications from the other circuitry internal to the system and configured to transmit the communications on the port. The switching module 140 functions to direct data traffic, which may be in a generic format, between the node controller 134 and the configurable packet-based interfaces 162, 166, 170 and between the packet manager 148 and the configurable packet-based interfaces. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol. In a selected embodiment, a 256-Gbit/s switch 140 connects the on-chip memory 118 and processors 102, 106, 110, 114 to the three HyperTransport/SPI-4 links 162, 166, 170, and provides transparent forwarding of network, ccNUMA access, and HyperTransport packets when necessary.

The configurable packet-based interfaces 162, 166, 170 generally function to convert data from a high-speed communication protocol (e.g., HT, SPI, etc.) utilized between multiprocessor devices 100 and the generic format of data within the multiprocessor devices 100. Accordingly, the configurable packet-based interface 162, 166, 170 may convert received HT or SPI packets into the generic format packets or data words for processing within the multiprocessor device 100, such as by using a receiver interface (which amplifies and time aligns the data received via the physical link and then converts the received protocol-formatted data into data from a plurality of virtual channels having the generic format), hash and route block and receiver buffer for holding the data until a routing decision is made. Packets arriving through receiver interface(s) of the chip can be decoded in either SPI-4 mode (native packet mode) or in HyperTransprot (HT) mode, in which case, it uses a special extension called Packet-over-HT (PoHT) to transfer the packets. From a logical perspective, both modes provide almost identical services. In addition, the configurable packet-based interfaces 162, 166, 170 may convert outbound (transmit) data of a plurality of virtual channels in the generic format received from the switching module 140 into HT packets or SPI packets, such as by using a transmitter formatter and transmitter interface, which take the incoming packet data chunks from the switch and format them according to the mode it is configured in, and then drive the high-speed formatted stream of data onto the physical link coupling the present multiprocessor device 100 to another multiprocessor device. The particular conversion of packets to generic formatted data performed by the configurable packet-based interfaces 162, 166, 170 is based on configuration information, which, for example, indicates configuration for HT to generic format conversion or SPI to generic format conversion.

The system controller 152 is coupled to provide interrupts to the interrupt lines in processors 102, 106, 110, 114 and is further coupled to receive interrupt requests from system modules (such as packet manager 152 or packet-based interfaces 162, 166, 170 illustrated in FIG. 1) and from other devices within the system 100 (not shown). In an alternative embodiment described herein, the interrupt mapping function may instead or in addition be provided in the various system modules that generate interrupts, such as the packet manager 152 or packet-based interfaces 162, 166, 170 illustrated in FIG. 1. The system controller 152 may map each interrupt to one of the interrupt lines of processors 102, 106, 110, 114, and may assert an interrupt signal to the selected processor 102, 106, 110, 114. The processors 102, 106, 110, 114 may access the system controller 152 to determine the source of a given interrupt. The system controller 152 may employ any mapping mechanism. In one embodiment, the system controller 152 may comprise a channel register and a source register to map each interrupt request to each processor 102, 106, 110, 114. The channel register identifies to the processor which channels are generating interrupts, and the source register indicates the real source of a channel's interrupt. By using a programmable interrupt controller in the packet manager with interrupt channel and source information stored in configuration status registers, the interrupt mapper can mask events and vector interrupts to their final destination using at most two CSR read operations by the processor, although additional mapping can be done in the system controller 152.

In one embodiment, the interfaces 162, 166, 170 may support a set of virtual channels (VCs) in which packets are transmitted. A virtual channel corresponds to the notion of "port" in the SPI-4 specification, and may be used to provide virtual independent flow of packets. The VC is "virtual" in that all the datapaths, including at the I/Os, are provided through a single physical channel, for example by time-multiplexing multiple flows through a single physical channel. Each virtual channel is defined to flow independently of the other virtual channels, even though the virtual channels may share certain physical resources (e.g., the port 172, 174, 176 on which the packets are flowing). These virtual channels may be mapped to internal virtual channels (also referred to as output virtual channels). The datapaths of the high-speed ports 162, 166, 170, the switch 140, and the packet manager 148 all support virtual channels. That is, the switch may grant a coupling between a source and a destination based not only on the ability of the source to transfer data and the destination to receive data, but also on the ability of the source to transfer data in a particular output virtual channel and the destination to receive data on that output virtual channel. Thus, requests from sources may indicate the destination and the virtual channel on which data is to be transferred, and requests from destinations may indicate the virtual channel on which data may be received. Additionally, in some embodiments, the switch 140 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

In one embodiment, the system 100 (and more particularly the processors 102, 106, etc., the memory controller 122, the interfaces 162, 166, etc., the node controller 134, the packet manager 148, the switch 140, the system controller 152 and the bus 130) may be integrated onto a single integrated circuit as a system on a chip configuration. Additional circuitry (such as PCI interfaces, serial interfaces, Personal Computer Memory Card International Association (PCMCIA) interfaces, etc.) may also be integrated. Alternatively, other embodiments may implement one or more of the devices as separate integrated circuits. In another configuration, the system memory may be integrated as well. Alternatively, one or more of the components may be implemented as separate integrated circuits, or all components may be separate integrated circuits, as desired. Any level of integration may be used. The system 100 may be designed to take advantage of the integration by tightly coupling the components to provide high performance packet processing. Specifically, the processors 102, 106, etc., the L2 cache 118, the memory controller 122, and the packet interface circuits 162, 166, 170 may be tightly coupled to receive packets, process them, and forward the packets on (if necessary).

The tight coupling may be manifested in several ways. For example, the interrupts may be tightly coupled. An I/O device (e.g., the packet interface circuits 162, 166, 170) may request an interrupt which is mapped (via an interrupt map in the packet manager or system controller) to one of the processors 102, 106, 110, 114. Another situation arises where descriptors are processed by software in connection with the packet manager operations. In both situations, a minimum count of processed packets or descriptors is sometimes required before processing the interrupt or descriptor so that the system 100 functions efficiently, but a timer is required to prevent such a minimum count requirement from blocking an interrupt from issuing or a descriptor from being processed.

As will be understood, the multiprocessor device 100 of the present invention provides multiprocessing functionality on its own which makes it suitable for scientific and embedded applications requiring significant computational capabilities. In a selected embodiment, the multiprocessor device 100 of the present invention contains a number of peripherals along with its sophisticated memory and communication support. For example, in a selected embodiment, the processor cores (e.g., 102) are 0.8 to 1.2-GHz, 64-bit MIPS with 64 kbytes of level one cache memory per processor and 1 Mbyte of level two cache 118 per chip; an 800-MHz DDR controller 122; off-chip ccNUMA support and optional ECC support. Three 8/16-bit receive/transmit ports 162, 166, 170 are also provided that are configurable as either HyperTransport or SPI-4 links. Additional peripheral features include a 32-bit 33/66-MHz PCI interface or 64-bit 133-MHz PCI/x interface 126; an input/output bridge 156 that includes a 10/100/1000 Ethernet MAC interface, general-purpose I/O ports, SMBus serial interfaces and four DUARTs.

In addition to providing stand alone computational functions, the multiprocessor devices 100 may also be used in communication-oriented applications that need significant computational support, like an array of HyperTransport linked chips for use with Internet service routers and switches with deep content switching and differentiated services such as quality-of-service (QoS) and virtual private networks (VPNs). The multiprocessor devices 100 may also be used in Internet-Protocol (IP) servers and subscriber-management platforms, servers supporting high computational requirements for scientific or Enterprise Java environments, and wireless infrastructure equipment. With three ports 172, 174, 176 on the chip, up to eight chips can be connected via the HyperTransport links in a "cube" configuration of nodes, for a 32-processor system.

When used in a HyperTransport linked network, the multiprocessor devices 100 provide a highly integrated nonuniform memory access (NUMA) architecture with low power consumption that multiplexes memory and I/O traffic on the same link. In contrast to conventional symmetrical multiprocessing systems (where all processors have the same memory access time and a bus or switch acts as an interface between processors and the memory subsystem so that cache coherence is maintained by monitoring the bus or the switch traffic), with NUMA, the memory address space is made up of the combined local memory (e.g., system memory 125) from each node in the system. A processor can access its local memory faster than nonlocal memory. NUMA systems have the advantage of being easily expanded, while adding a processor to a conventional SMP shared memory architecture is more difficult because an additional port is needed.

By using a cache-coherent form of NUMA (ccNUMA), on-chip caches can remain up to date even while data moves through the processor/memory interconnect. The on-chip double-data-rate (DDR) memory controller 122 supports the chip's local, off-chip memory, and its HyperTransport links 162, 166, 170 provide ccNUMA support.

Figure 2:
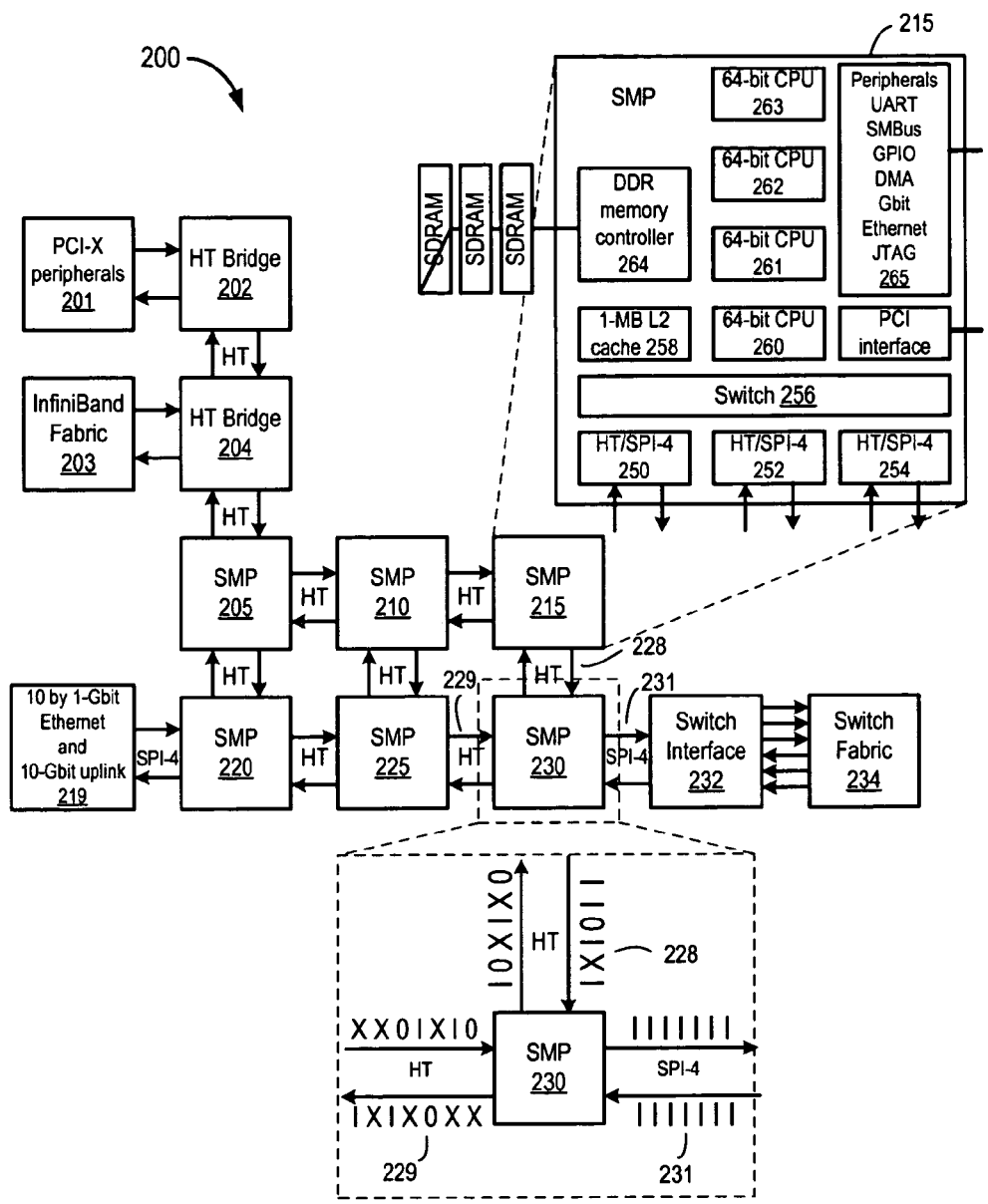
FIG. 2 depicts an example multiprocessor switch application of the present invention.

FIG. 2 depicts an example multiprocessor switch application of the present invention showing how the HyperTransport/SPI-4 link architecture can be used in communication and multichip multiprocessing support. As illustrated, each link (e.g., 250, 252, 254) can be configured as an 8- or 16-bit HyperTransport connection, or as a streaming SPI-4 interface. In addition, each link includes hardware hash and route acceleration functions, whereby routing information for an incoming packet are calculated. The routing information determines how a packet will steer through the internal switch (e.g., 256) of a multiprocessor device (e.g., 215). The destination through the switch can be either an output port or the packet manager input. Generally speaking, the steering is accomplished by translating header information from a packet (along with other input data) to an output virtual channel (OVC). In addition, the HyperTransport links (e.g., 250, 252, 254) work with a mix of HyperTransport transactions, including encapsulated SPI-4 packets and nonlocal NUMA memory access.

Large amounts of streaming data can also be handled when a port (e.g., 231) is set up as an SPI-4 link. This is ideal for high-speed communication environments. It can supply a link to external communication connections that have a native SPI-4 interface like Ethernet MACs 219 or to switch-fabric interface chips 232, 234.

As illustrated in FIG. 2, three HyperTransport links (e.g., 228, 229, 231) enable an expandable system. Two links (e.g., 228, 229) are needed for a pass-through architecture where multiple units (225, 230, 215) are daisy-chained together. In this configuration, the links 228, 229 between multiprocessor units carry HT I/O packets (indicated as "X" data in FIG. 2), ccNUMA packets (indicated as "0" data in FIG. 2) and/or SPI-4 packets (indicated as "|" data in FIG. 2). The pass-through architecture is ideal for processing as data moves along the chain. Unfortunately, implementing the same links for NUMA transfers will reduce the bandwidth available for other traffic. It is possible to link a pair of chips using the third link for NUMA transfers if the daisy-chained link bandwidth is needed for I/O or network packets. A third link allows the nodes in the array to extend in another direction. This can work in two ways. It can supply another path for a daisy-chain architecture. It can also provide additional processors to work on data forwarded from the daisy-chain data stream. This is great for such applications as the VPN processing that is handed off to additional processing nodes. Alternatively, when the third link (e.g., 231) is used to connect the multiprocessor unit 230 to an external switch interface 232, the third link carries SPI-4 packets (indicated as "l" data in FIG. 2).

Figure 3:
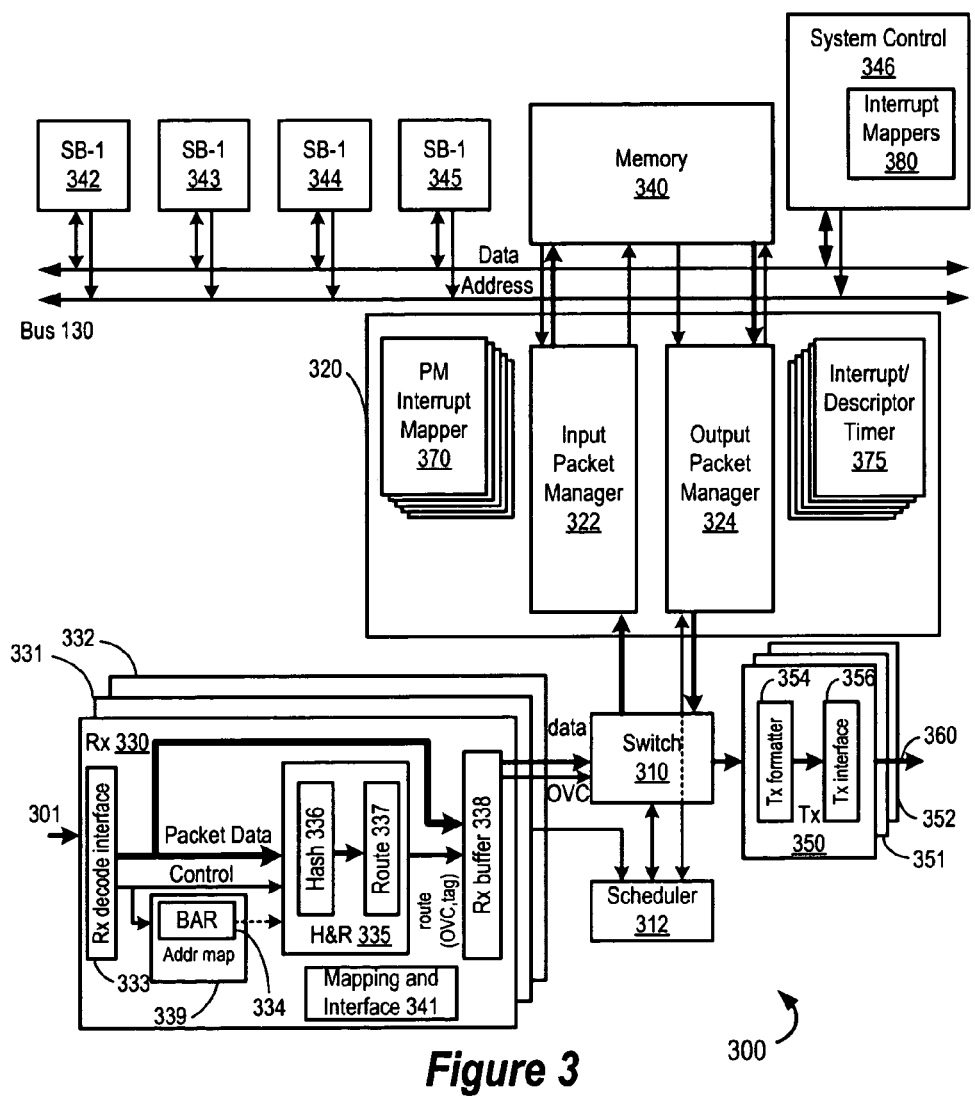
FIG. 3 depicts the packet processing components of the multiprocessor switching system in accordance with the present invention.

FIG. 3 depicts additional selected details concerning the receiver port and packet manager to show the packet processing components of the network and system chip 300 of the present invention. As depicted, packet data received at a receiver circuit 330–332 is routed to memory 340 by the packet manager 320 under control of descriptors that are set up by the software executed on one or more processors 342–345. After the packet manager 320 is finished using the descriptor(s) to transfer a packet, interrupts to the processors are generated by the interrupt mapper 370 or ownership of the descriptor is released or transferred to the software, which then distributes the descriptor to the processors 342–345 for processing. In accordance with the present invention, the allocation of descriptors to processors is typically done before any packets are received at the device 300 by the software. In particular, software that may run on one of the processors (e.g., SB-1 342) may distribute and assign the descriptors to the processors for handling. This load balancing processor will handle the load balancing such that if a processor finishes processing its assigned descriptors, it will ask for more descriptors to work on from the load balancing processor. In accordance with the present invention, the load balancing processor will give more descriptors to the requesting processor. Then this processor will work on the range of descriptors that are assigned to it.

In particular, incoming packets are received at a receiver circuit 330–332 that includes a hash and route (H&R) circuit 335 which maps packets from the IVCs to an output virtual channel (OVC). The OVC is used as the internal virtual channel for the system 300, and in particular is used to transmit packets through the switch 310 to the packet manager circuit 320 or to the transmitter circuits 350–352. Viewed in another way, requests to transmit packet data through the switch 310 are made based on the OVC of the packet, which identifies both the destination of the packet and the virtual channel at the destination. The OVC may also be referred to herein as a destination and the virtual channel at the destination. An example of how input virtual channels are routed by the H&R circuit via OVCs to various virtual channels for input queue and transmitter destinations is depicted in U.S. patent application Publication No. US 2003/0095559 A1, FIGS. 2–4 and the associated description of which was filed on Oct. 11, 2002, and is incorporated herein by reference in its entirety.

As depicted, the network and system chip 300 includes an on-chip five-port switch 310 that connects a node controller (shown in FIG. 1 as node controller 134) and packet manager 320 to three high-speed transmit/receiver circuits 330–332, 350–352. Software resident in the memory 340 and processors 342, 344 may process and modify incoming packets, may require direct storage in memory 340 without modification, and may generate packets for transmission via transmitter circuits 350–352. The node controller manages HyperTransport (HT) transactions and remote memory accesses for the cache coherent, distributed-shared-memory model of the system. The packet manager 320 provides hardware-assisted packet processing capabilities, such as DMA engines, channel support, multiple input/output queues, TCP/IP checksum functions, and output scheduling. A time-out signal generator 375 is provided for use by the packet manager with issuing interrupts and handling descriptors. The high-speed receiver and transmitter circuits can operate in one of two modes; HT or SPI-4 Phase 2. The 16-bit HT mode allows connection to companion multiprocessor devices in a daisy-chain configuration, to Hyper-Transport bridge chips for additional I/O devices, or to an external switch for scalable bandwidth applications. The SPI-4 mode is intended for direct connection to physical layer network devices—e.g., 10 GE MAC, OC-192 SONET framer, or to an application specific (ASIC) chip that provides customer enabled network functions.

The path of a packet through the multiprocessor device 300 will now be described with reference to the network and system chip 300 depicted in FIG. 3. In this example, a packet comes into the chip through one of the receiver ports (e.g., 301), reaches software, is potentially modified, then sent to another chip through a transmit port 360.

Packet Reception

1. The packet 301 arrives through one of the three receiver interfaces 330–332 of the chip. The receiver interface (e.g., 330) can run in either SPI-4.P2 mode (native packet mode) or in HyperTransport (HT) mode, in which case, it uses a special extension called Packet-over-HyperTransport (PoHT) to transfer the packets. From a logical perspective, both modes provide almost identical services. The receiver interface 330 deals with the specifics of the protocol and converts the control and data streams 301 into an internal packet format for the chip.

2. The packet control and data streams are sent to the hash and route (H&R) block 335, which includes a hash 336 and route 337 functionality. The purpose of the hash block 336 is to extract fields from the packet (specific parts of the headers usually) and hash them if necessary. The hash block 336 provides a small signature of the packet to a route table 337. Hashing is completely optional, can consist of the simple extraction of a byte from the packet, or can be any technique or algorithm that turns a variable-sized amount of text into a fixed-sized output (hash value).

3. The route block 337 takes parameters from the packet (such as the result of the hash and the input virtual channel the packet came in on) and looks up in a table to figure out where exactly the packet will go. Not only is the destination block determined (transmitters 350–352 or packet manager input (PMI) 322), but block-specific values like the virtual channel (for a transmitter) or the input queue (for the PMI) are also output from the route block 337.

4. While the packet is hashed and routed, it is also stored in the receiver buffer 338, which may be a large (e.g., 16 KB) buffer. The stored packet data will stay there until a routing decision has been made and it is scheduled to its destination block. The packet does not need to be entirely stored in the buffer 338 before being sent to its destination. For example, if the routing has been determined early, the first (e.g., 16 byte) chunk of data can be sent as soon as a threshold amount of bytes of the packet has been gathered.

5. As soon as a chunk of data from the packet is ready to go, the receiver interface (e.g., 330) sends a request to the switch scheduler 312. When the chunk can be scheduled, the scheduler 312 applies the required changes to the switch 310 and informs the receiver buffer 338 that it can start transmitting.

6. The receiver buffer 338 sends the chunk of data to the switch 310 and frees up the buffer space for more incoming packet data.

7. In this example, the routing table 337 has determined that the packet should be sent to the packet manager 320 to be processed by software. The input packet manager (PMI) portion 322 receives the packet data from the switch 310. A specific input queue (IQ) of the PMI 322 is chosen for the packet by the H&R module 335.

8. To know where to put the packet data, the PMI 322 reads one or more descriptors from main memory 340 (or from L1 or L2 caches or from a remote note). The descriptors contain the address and sizes of data buffers set aside by software to be used for incoming packets. They are also used as a synchronization mechanism between hardware and software.

9. As soon as the PMI 322 has a buffer to put the packet data into, it starts streaming the data to the memory 340 through the system bus. Once again, the final storage might be in a cache or in main memory.

10. When the PMI 322 is done with the packet, it writes back information about the packet in the descriptor(s) to tell the software that it is done with the packet and communicate some information about the packet (like its size).

11. The software typically waits (e.g., spins) on the descriptors in the various queues and as soon as one is marked ready by the PMI 322, it reads it. It can also be interrupted by the PMI 322 when a new packet arrives. It can also read the current pointer of the PMI 322 for a particular IQ.

12. The packet data is typically read, at least in part, by the software to figure out what to do with it. There is no particular constraint on which CPU 342, 344 deals with which IQ. There must just be some synchronization between the CPUs if IQs are shared.

Software Background Tasks

13. In the background, software finds free data buffers (typically recycled from packets just transmitted from an output queue (OQ)) and updates the descriptors in the IQs to provide the PMI 322 with storage for future packets. The software also updates a count field in the PMI 322 to tell it the number of new descriptors added.

14. As in the previous step, the software needs to reclaim output queue (OQ) descriptors that have been processed by the output packet manager (PMO) in order to free the data buffers and potentially use them for IQ descriptors.

Packet Transmit

15. When the software wants to send or forward a packet (e.g., from CPU 344), it needs to write it into a buffer in memory 340. Depending on the source of the packet data (higher-level software, fragments of input packets . . . ), the software might need to fully copy or create the packet data, modify it or leave it as is.

16. When the packet data is ready, the software will write one or more descriptors in the output queue (OQ) of the PMO 324 that has been chosen for the packet. The descriptor (s) contain essentially the address of the buffer where the packet fragments can be found and their size.

17. The PMO 324 waits for descriptors to be ready for transfer in the OQs. The software writes to a special register in the PMO 324 every time it adds new descriptors to be transmitted. Descriptors are read by the PMO 324 to extract the relevant information.

18. When the address where the packet resides at in memory 340 is known to the PMO 324, through the descriptor(s), the PMO 324 starts reading the address. The PMO 324 has a large output buffer equivalent to the receiver buffer 338, which is used to prefetch outstanding packet chunks, waiting for them to be scheduled for transmission.

19. PMO 324 writes the descriptor(s) back to memory 340 when the data associated with each descriptor is completely placed in the output buffer.

20. Each OQ in the PMO 324 sends all of its packets to the same internal destination (block, virtual channel). However, different OQ's can have different destinations. Accordingly, as soon as the PMO 324 has a full chunk of data available, it sends a request to the scheduler 312, much like the receiver interface does in step 5, to get the chunk scheduled to its destination. The scheduler 312 arbitrates between the many requests and when a chunk is scheduled, it changes the connections in the switch 310 and informs the source (the PMO 324 in this case) that it can transmit the chunk.

21. As soon as the PMO 324 gets a grant from the scheduler 312, the PMO 324 transmits the corresponding chunk of data to the switch 310. The PMO 324 can then free and reuse the allocated storage in the PMO buffer.

22. The switch 310 forwards the chunk of data to the final destination, such as a transmitter 350 in this example, as indicated by the scheduler 312.

23. Just like the receiver interfaces, the transmitters 350–352 can run in SPI-4 or HT mode. The transmitter formatter 354 will take the incoming packet data chunks from the switch and will format them according to the mode it is configured in. While the PMO 324 has enough storage to cover the round-trip latency to main memory, the transmitters 350–352 provide minimal buffering (4 KB) required to assemble outbound bursts of data on the high-speed links. In a selected embodiment, all data transmits through a 4 KB transmit buffer.

As will be appreciated, packets can go through the switch 310 without touching memory 340 and CPUs 342, 344 (skipping steps 7 to 21). Packets can also be sinked by software and not be forwarded (skipping steps 14 to 23) or sourced by software directly (skipping steps 1 to 13).

In a selected embodiment, each VC is independently flow-controlled so that if one VC is blocked, the other ones can still flow through. This way, there is no head-of-line (HOL) blocking due to the congestion of a flow. In addition, the flow of packets is controlled so that packets on the same VC travel one after the other, and fragments of different packets cannot be interleaved within the chip 300. By including start of packet (SOP) and end of packet (EOP) signaling in the control signal, the receivers can differentiate between the packets, even when packets of different VCs are interleaved on the input and output ports, depending on the unit of transfer on the underlying physical channel. In SPI-4 mode, each high-speed receive/transmit port (e.g., 162 in FIG. 2) supports multiple (e.g., 16) VCs with independent, calendar-based flow control. In HT mode, each high-speed receive/transmit port uses a special extension to the regular HT protocol called Packet-over-HyperTransport (POHT) which emulates the functionality of the SPI-4 interface, providing multiple (e.g., 16) independent channels per port (in addition to the regular, non-packet HT and HTcc VCs).

The hash and route (H&R) block 335 makes all of the routing decisions for ingress packets from the high-speed receiver ports 330–332 by calculating, for each packet, an output virtual channel (OVC) which is used for internal switching on the multiprocessor device 300. The packets are then sent to either the packet manager input (PMI) 322 or to one of the transmit ports 350–352. The H&R module 335 is located in each of the three high-speed receiver ports 330–332. As a packet 301 enters the receiver port (e.g., 330), it is decoded and control information is extracted by the receiver interface or decoder 333. The H&R module 335 calculates the routing result by using this control information along with the packet data and several programmable tables in the H&R module 335. Routing information is encoded in the form of a switch or output virtual channel (OVC) which is used by the on-chip switch 310 to route packets. The OVC describes the destination module, such as the PMI 322 or transmitter ports 350–352, and either the input queue number (IQ) in the case of the PMI or the output channel in the case of the transmitter ports. When targeting the packet manager 320, the output virtual channel corresponds directly to IQs. On the output side, the packet manager 320 maps an OQ into one OVC which always corresponds to a transmitter port. In addition, multiple sources can send packets to a single destination through the switch. If packets from different sources (receivers 330, 331, 332 or PMO 324) are targeted at the same output VC of a transmitter port or the IQ of the PMI 322, the switch 310 will not interleave chunks of packets of different sources in the same VC. Both the packet data and its associated route result are stored in the receiver buffer 338 before the packet is switched to its destination. The H&R module 335 can be implemented by the structures disclosed in copending U.S. patent application entitled "Hash and Route Hardware With Parallel Routing Scheme" by L. Moll, Ser. No. 10/684,871, filed Oct. 14, 2003, and assigned to Broadcom Corporation, which is also the assignee of the present application, and is hereby incorporated by reference in its entirety.

Figure 4:
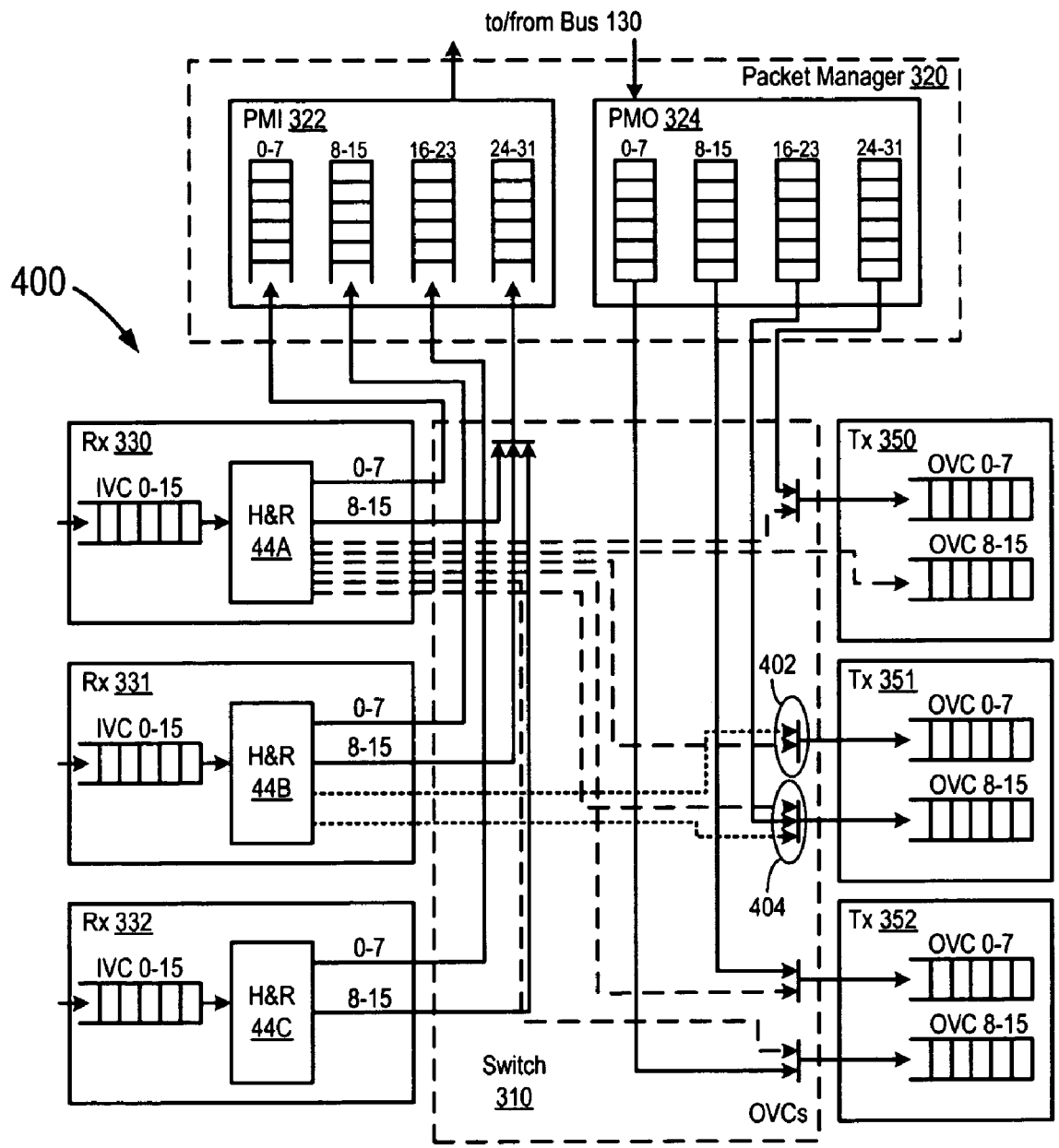
FIG. 4 is a block diagram illustrating one embodiment of virtual channels in the system of FIG. 1.

Turning now to FIG. 4, a block diagram illustrating one embodiment of virtual channels in the system 300 is shown, as well as examples of splitting and merging packet traffic. In the illustrated embodiment, the receive interface circuits 330–332 and the transmit circuits 350–352 are shown. Additionally, the packet manager circuit 320 is shown as including an input packet manager circuit (PMI) 322 and an output packet manager circuit (PMO) 324. The PMI 322 is coupled to transmit write commands on the bus 130 to write received packets to memory. The PMO 324 is coupled to transmit read commands on the bus 130 and to receive the read data comprising packets to be transmitted from the system 300. Additionally, as mentioned above, each of the PMI 322 and the PMO 324 may be configured to read and write descriptors defining the locations in memory to which the packets are to be read and written. Upon completion of data transfer specified by a descriptor, each descriptor is updated and released to software by writing the descriptor back to memory. For purposes of providing efficient descriptor write back operations, the descriptors may be collected until a predetermined number of descriptors are accumulated or a descriptor timer 375 expires, whichever occurs first. Each of these events (packet transfer, descriptor processing, errors) and others may cause interrupts to be issued by the packet manager 320 which are issued after a predetermined number of packets are processed or an interrupt timer 375 expires, whichever occurs first.

Each receive circuit 330–332 supports a set of input virtual channels (IVCs) defined by the interface from which the receive circuit receives packet data. For example, the SPI-4 interface and the HT interface may both support 16 virtual channels in hardware (although more may be used by software in the SPI-4 interface, since an 8-bit virtual channel value is supported). Thus, each receive circuit 330–332 supports 16 IVCs (numbered 0–15 in FIG. 4). Similarly, each transmit circuit 350–352 supports 16 output virtual channels (OVCs), numbered 0–15 in FIG. 4. Other embodiments may employ more or fewer IVCs and OVCs according to the interfaces supported by those embodiments.

The PMI 322 includes a logical set of input queues (e.g. 32 in the illustrated embodiment, numbered 0–31, although more or fewer input queues may be included in other embodiments). The PMO 324 includes a logical set of output queues (e.g. 32 in the illustrated embodiment, numbered 0–31, although more or fewer output queues may be included in other embodiments). In a selected embodiment, each queue has its own interrupts that require mapping to a specified processor.

Each receive circuit 330–332 includes a hash and route (H&R) circuit 44A–44C in the illustrated embodiment, which maps packets from the IVCs to an output virtual channel (OVC). The OVC is used as the internal virtual channel for the system 400, and in particular is used to transmit packets through the switch 310 to the packet manager circuit 320 or to the transmit circuits 350–352.

In the illustrated embodiment, the H&R circuits 44A–44C may map the IVCs to one of 16 PMI VCs (numbered 0–15 in FIG. 4, using solid lines from the H&R circuits 44A–44C). These PMI VCs may be further mapped to input queues in the PMI 322, e.g., using a register to which the H&R circuit 44A is coupled. That is, VCs at the PMI 322 may correspond directly to input queues. In the illustrated embodiment, PMI VCs are mapped to input queues in blocks of eight (e.g., PMI VC 0–7 is mapped to input queue 0–7, or input queue 8–15, or input queue 16–23, or input queue 24–31 in a one-to-one fashion). In other embodiments, each PMI VC may be individually mappable to an input queue, or other sized blocks of input queues may be mappable to PMI VCs. In yet another embodiment, the H&R circuits 44A–44C may directly map IVCs to PMI input queues (e.g., without the intermediate step of PMI VCs). Additionally, the H&R circuits 44A–44C may map packets from an IVC to an OVC in one of the transmit circuits 350–352, illustrated for H&R circuit 44A with dashed lines through the OVCs block to the transmit circuits 350–352.

The H&R circuits 44A–44C may be used to split packets from the same IVC to different OVCs (e.g., different input queues in the PMI and/or OVCs in the transmit circuits 350–352). Thus, the H&R circuits 44A–44C may provide software flexibility to separate packets for processing versus packets to be passed through the transmit circuits 350–352 based on various packet attributes (such as header values), or may provide for separating packets into different input queues in the PMI 322 (e.g., for different types of processing) based on various packet attributes. The H&R circuits 44A–44C may also be programmed to map IVCs to OVCs without using any additional packet attributes, or a combination of such mappings and other mappings using additional packet attributes, as desired. In other embodiments, the receive circuits 330–332 may not include H&R circuits and may instead use a programmable or fixed mapping of each IVC to a specified OVC (transmit circuit 350–352 and OVC in that circuit or PMI 322 and an input queue in the PMI 322). It is noted that packets which are routed from a receive circuit 330–332 directly to a transmit circuit 350–352 bypass the packet manager circuit 320, the system memory, and processing by the processors.

The PMO 324 output queues are also mapped to various transmit circuits 350–352 and to OVCs in those transmit circuits 350–352. In the illustrated embodiment, output queues are mapped to transmit circuits and OVCs in blocks of 8, similar to the mapping of IVCs to input queues. Other embodiments may map output queues individually, or in other-sized blocks, as desired. In one embodiment, the PMO 324 includes a configuration register or registers programmed with the mapping of each block of 8 output queues to a corresponding group of OVCs (which identify the transmit circuit 350–352 and the OVC within that transmit circuit). Other embodiments may use more elaborate mapping mechanisms similar to H&R circuits, to map packets based on packet attributes in addition to output queues, if desired.

FIG. 4 illustrates, via the solid arrows between the H&R circuits 44A–44C and the PMI 322, an exemplary mapping from the PMI VCs of the H&R circuits 44A–44C to the input queues of the PMI 322. The exemplary mapping is but one example of the mappings that may be used, as programmed into the receive circuits 330–332 by software. In the example, PMI VCs 0–7 from the H&R circuit 44A are mapped to input queues 0–7; PMI VCs 0–7 from the H&R circuit 44B are mapped to input queues 8–15; PMI VCs 0–7 from the H&R circuit 44C are mapped to input queues 16–23; and PMI VCs 8–15 from each of the H&R circuits 44A–44C are merged to input queues 24–31. When mappings merge the PMI VCs from different H&R circuits 44A–44C, the switch 310 may perform the merging on packet boundaries. That is, when a given receive circuit 330–332 has been granted permission to transfer a packet to an input queue that is merged among the receive circuits 330–332, the switch inhibits granting any other receive circuit 330–332 on that input queue until the granted receive circuit 330–332 reaches a packet boundary. Any combination of PMI VCs from different receive circuits 330–332 may be merged into input queues, as desired in various mappings.

FIG. 4 also illustrates, via the solid arrows between the PMO 324 and the transmit circuits 350–352, an exemplary mapping of output queues to transmit circuits and OVCs. The exemplary mapping is but one example of mappings that may be used, as programmed by software. In the illustrated mapping, output queues 0–7 are mapped to OVCs 8–15 in the transmit circuit 352; output queues 8–15 are mapped to OVCs 0–7 in the transmit circuit 352; output queues 16–23 are mapped to OVCs 8–15 in the transmit circuit 351; and output queues 24–31 are mapped to OVCs 0–7 in the transmit circuit 350. Additionally, receive circuits 330–332 may map IVCs to OVCs, and thus there may be merging of packets from receive circuits 330–332 and output queues to an OVC. Again, the switch 310 may handle this merging on packet boundaries.

As mentioned above, there may be mappings of IVCs in receive circuits 330–332 to OVCs in the transmit circuits 350–352. In FIG. 4, for example, dashed lines illustrate possible mappings from the receive circuit 330 IVCs (via the H&R circuit 44A) to the OVCs of the transmit circuits 350–352. Additionally, dotted lines from the receive circuit 331 (the H&R circuit 44B) to the transmit circuit 351 OVCs illustrate two possible mergings of packet streams, one indicated at 402 where the packet stream from receiver 331 merges with a packet stream from receiver 330 into OVC 0–7 in transmitter circuit 351, and the other indicated at 404 where the packet stream from receiver 331 merges with a packet stream from receiver 330 and a packet from PMO channels 16–23 into OVC 8–15 in transmitter circuit 351. Again, the switch 518 may merge packets from different receive circuits 330–332 to a given OVC on a packet boundary basis. Merging may occur between any combination of receive circuits 330–332 and the PMO 324.

The input queues of the PMI 322 and the output queues of the PMO 324 may be logical queues. That is, the queues may actually be implemented in system memory. The PMI 322 and the PMO 324 may include buffers to buffer the packet data being transmitted to and from the system memory. The queues may be implemented in any fashion. In one particular embodiment, each queue is implemented as a descriptor ring (or chain) which identifies memory buffers to store packet data corresponding to a given input queue. In other embodiments, the queues may be implemented in any desired fashion (e.g., linked lists, contiguous memory locations for the packet memory buffers, etc.). The PMI 322 and the PMO 324 may generate read and write commands to fetch and update descriptors.

It is noted that, while the receive circuits 330–332 and the transmit circuits 350–352 are described as supporting various virtual channels for packets, in some embodiments these circuits may support additional virtual channels for other types of traffic. For example, the HT interface is capable of carrying non-packet traffic (e.g., I/O traffic) in additional virtual channels. Additionally, in one embodiment, the HT interface may support coherent virtual channels (that is, virtual channels that carry coherent traffic) for transactions used to maintain coherency among devices on the HT interface. The receive circuits 330–332 and the transmit circuits 350–352 may be designed to additionally route data received on these VCs according to the HT definition and/or coherency requirements.

Figure 5:
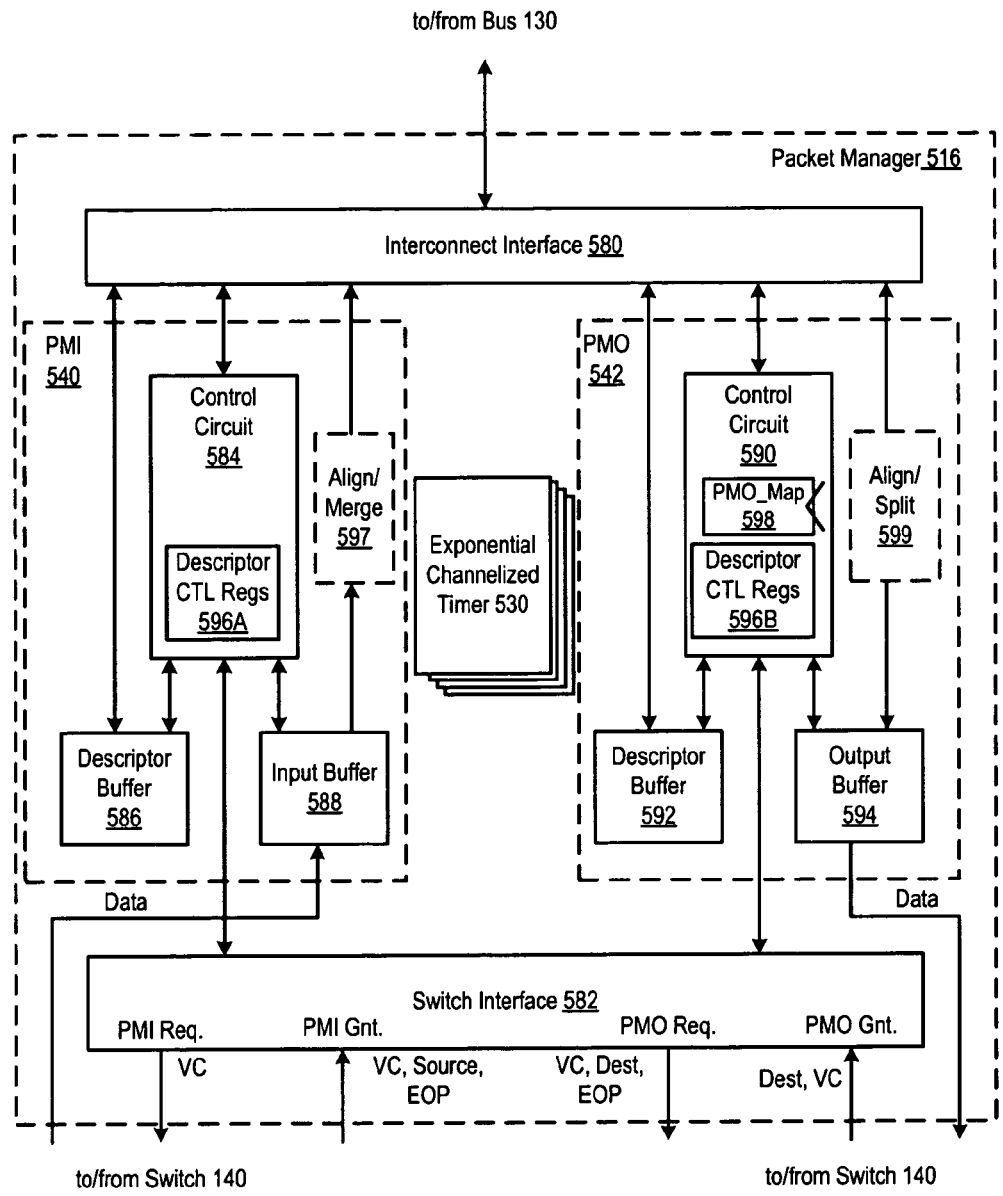
FIG. 5 is a block diagram of one embodiment of a packet manager circuit.

Turning now to FIG. 5, a block diagram of one embodiment of the packet manager circuit 516 is shown in greater detail. In the embodiment of FIG. 5, the packet manager circuit 516 includes an interconnect interface circuit 580 for communicating on the bus 130, the PMI 540, the PMO 542, and a switch interface circuit 582. The PMI 540 includes a control circuit 584, a descriptor buffer 586, and an input buffer 588. The PMO 542 includes a control circuit 590, a descriptor buffer 592, and an output buffer 594. The control circuit 584 includes a set of descriptor control registers 596A, and the control circuit 590 similarly includes a set of descriptor control registers 596B. Additionally, the control circuit 590 includes a PMO Map register 598. The interconnect interface 580 is coupled to the bus 130, the descriptor buffers 586 and 592, the control circuits 584 and 590, the input buffer 588, and the output buffer 594. The control circuit 584 is further coupled to the descriptor buffer 586, the input buffer 588, and the switch interface circuit 582. The input buffer 588 is coupled to receive data from the switch 140. The control circuit 590 is further coupled to the descriptor buffer 592, the output buffer 594, and the switch interface circuit 582. The output buffer 594 is coupled to provide data to the switch 140. The switch interface circuit 582 is coupled to request and grant interfaces to the switch 140 for the PMI 540 and the PMO 542.

Figure 6:
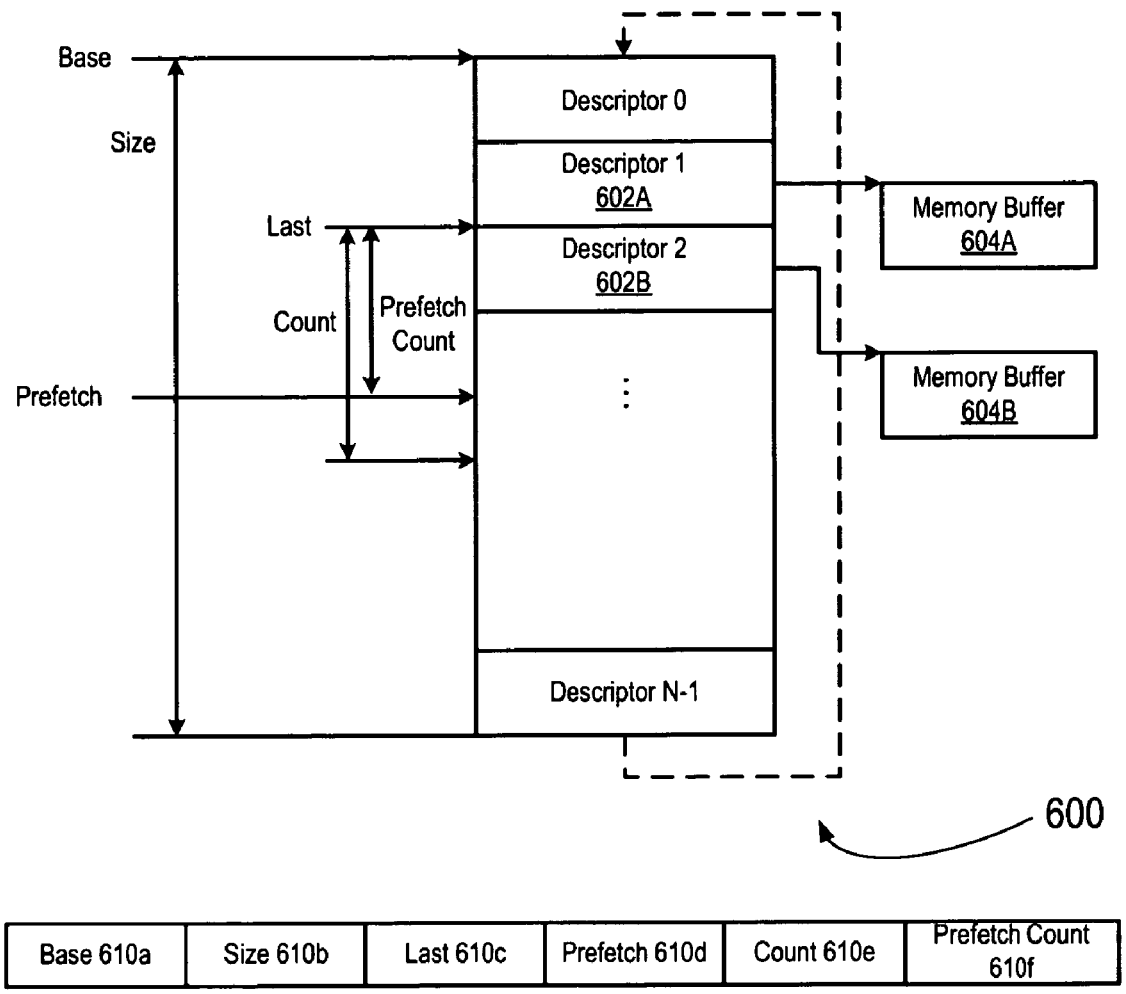
FIG. 6 is a block diagram of one embodiment of a set of descriptors and a corresponding descriptor control register or registers.

The control circuit 584 controls the transfer of packets from the receive interface circuits to the system memory. As mentioned above, the PMI 540 includes a logical set of input queues to which packets may be transferred. Each input queue is implemented, in the present embodiment, via a descriptor ring in memory. The descriptor ring comprises a set of descriptors, each of which identifies a memory buffer in memory that may be used to store packet data for the corresponding input queue. One or more descriptors may be occupied by a given packet. An exemplary descriptor ring for one embodiment is shown in FIG. 6 and described in more detail below.

The control circuit 584 may prefetch one or more descriptors (the next descriptors in the ring that are to receive packet data) into the descriptor buffer 586. In one embodiment, for example, up to 8 descriptors may be prefetched for each input queue. If at least one descriptor is available to receive packet data in a given input queue, the control circuit 584 may signal the switch interface 582 to request a packet on that input queue. In one embodiment, two descriptors may comprise a cache block. If the software is issuing two or more descriptors at a time, a prefetch of both descriptors may be generated as a combined command to reduce the traffic on the interconnect interface 580.

The switch interface circuit 582 may request a packet for an input queue using the PMI request interface. The PMI request interface indicates which input queue (which VC) the PMI has space to store data in. The PMI request interface may also include a valid indication indicating whether or not a request is being made. The PMI request interface may be similar to other destination request interfaces (e.g., those used by the transmit interface circuits). The switch 140 may grant to a source and destination once both the source and the destination have requested a transfer on the same destination VC. The PMI grant interface indicates which source is transferring data, on which VC (which input queue) and whether or not the transfer is the end of the packet (EOP). The switch interface circuit 582 may signal the control circuit 584 when a grant has been received, and the control circuit 584 may cause the corresponding data to be stored in the input buffer 588. The input buffer 588 may include storage for each input queue, to temporarily store packet data until a write command is generated to write the packet data to the memory buffer selected for the packet. In some embodiments, the input buffer 588 may be configured to store less than a full packet for a given input queue.

Generally, the control circuit 584 may generate read commands to the interconnect interface circuit 580 to prefetch descriptors into the descriptor buffer 586. Additionally, the control circuit 584 may generate write commands to the interconnect interface circuit 580 to write data from the input buffer 588 to the memory buffer, and to write the descriptor back to memory after the descriptor has been used to store packet data. The interconnect interface circuit 580 may transmit the commands on the bus 130 and, in the case of reads, return data to the descriptor buffer 586. In one embodiment, the bus 130 may perform cache block sized transfers (where a cache block is the size of a cache line in caches within the system 100, e.g. 32 bytes in one embodiment). In such embodiments, if a write command does not write the entire cache block, the interconnect interface circuit 580 may perform a read-modify-write operation to perform the write. As will be appreciated, a read-modify-write operation requires a delay while the cache line being written to is retrieved or read from memory over the system bus 130 so that it can be merged with (or written over in part by) the new data for the cache line. In one embodiment, descriptors may occupy one half of a cache block. In such embodiments, the packet manager circuit 516 may attempt to delay the write of the first descriptor of a cache block to allow the second descriptor to also be written concurrently (thus avoiding a higher latency read-modify-write operation). The delay may be fixed or programmable, and the first descriptor may be written using a read-modify-write operation if the delay expires without a write of the second descriptor. The second descriptor may subsequently be written using a read-modify-write operation as well. Because the system can not wait indefinitely for additional descriptors to be released, a programmable timer 530 is provided for controlling the delay.

The control circuit 590 controls the transfer of packets from memory to the transmit interface circuits. As mentioned above, the PMO 542 includes a logical set of output queues from which packets may be transferred. Each output queue is implemented, in the present embodiment, via a descriptor ring in memory, similar to the input queues. An exemplary descriptor ring for one embodiment is shown in FIG. 6 and described in more detail below.

The control circuit 590 may prefetch one or more descriptors (the next descriptors in the ring from which packet data is to be transmitted) into the descriptor buffer 592. In one embodiment, for example, up to 8 descriptors may be prefetched for each output queue. If at least one descriptor has packet data in a given output queue, the control circuit 590 may also prefetch the packet data into the output buffer 594. Once at least a switch transfer's worth of packet data has been read into the output buffer 594 for a given output queue, the control circuit 590 may signal the switch interface circuit 582 to request a transfer to the destination for that packet (one of the transmit interface circuits) for that output queue. In one embodiment, output queues are mapped to OVCs in the transmit interface circuits in groups of 8, as described above with respect to FIG. 4. The PMO_map register 598 may store the mappings, and thus the control circuit 590 may determine which destination and which OVC at that destination to request based on the mappings.

The switch interface circuit 582 may request a destination for an output queue using the PMO request interface. The PMO request interface may be similar to the request interface from the receiver interface circuits, and generally indicates which destination (which transmit interface circuit) and which VC (OVC) on the transmit interface circuit that the PMO has packet data to transmit. In other words, the PMO request interface generally indicates the OVC that the PMO has packet data to transmit on. Additionally, if the requested transmission will include the end of the packet, the PMO request interface indicates such with the EOP indication. The PMO request interface may also include a valid indication indicating whether or not a request is being made, packet error status, etc. The PMO grant interface, again similar to the receive grant interface, indicates which destination and VC is granted (e.g., which OVC is granted). The switch interface circuit 582 may signal the control circuit 590 when a grant has been received, and the control circuit 590 may cause the corresponding data to be read out of the output buffer 594 to the switch 140 (and ultimately to the destination transmit interface circuit).

Generally, the control circuit 590 may generate read commands to the interconnect interface circuit 580 to prefetch descriptors into the descriptor buffer 592 and to prefetch packet data into the output buffer 594. Additionally, the control circuit 590 may generate write commands to the interconnect interface circuit 580 to write the descriptor back to memory after the packet data from that descriptor has been read into the output buffer 594. The interconnect interface circuit 580 may transmit the commands on the interface and, in the case of reads, return data to the descriptor buffer 590 and the output buffer 594.

As mentioned above, the interconnect interface circuit 580 may include the circuitry for communicating on the bus 130. Additionally, in some embodiments, the interconnect interface circuit 580 may include buffers to store read and write commands until they can be transmitted on the bus. Again, the programmable timer 530 may be used to generate timer request signals for each channel to be used in controlling the timing of system operations, such as descriptor write back or interrupt issuance upon completion of a packet transfer.

In some embodiments, the PMI 540 may include an align/merge circuit 597 coupled between the input buffer 588 and the interconnect interface 580. In one embodiment, a memory buffer for packet data need not be aligned to a cache block boundary in the system memory. The align/merge circuit 597 may align the packet data from the input buffer 588 to the offset specified in the descriptor. Additionally, the align/merge circuit 597 may merge switch transfers of data to fill a cache block, if the switch transfer width is less than a cache block in size. Similarly, the PMO 542 may include an align/split circuit 599 coupled between the interconnect interface 580 and the output buffer 594. The align/split circuit 599 may drop leading bytes from a cache block that are not part of a packet, and may merge data from multiple commands on the bus 130 to create a switch transfer's worth of data (e.g. 16 bytes, in one embodiment).

In some embodiments, various virtual channels may be used to ensure deadlock-free transfer on the bus 130. For example, in one embodiment, the PMI 540 may implement a nonposted command channel for descriptor prefetches; a posted command channel for descriptor write backs, packet data writes, and configuration/status register (CSR) read responses; a response channel for read data responses; and a CSR read/write channel for CSR read and write commands. In one embodiment, the PMO 542 may implement a nonposted command channel for descriptor prefetches and packet data fetches; a posted command channel for descriptor write backs and CSR read responses; and a response channel for read data responses; and a CSR read/write channel for CSR read/write commands.

An exemplary descriptor ring 600 is shown in FIG. 6, for one embodiment, along with a corresponding descriptor control register or registers 610 (part of the descriptor control registers 596A). Descriptor rings may be similar for both the PMI 540 and the PMO 542. In the embodiment of FIG. 6, the descriptors are stored in a memory region defined by the base address ("base" field of the registers 610 in FIG. 6) and the size ("size" field of the registers 610 in FIG. 6). The base address points to the first descriptor (descriptor 0) in memory, and the size is an offset to the end of the last descriptor (descriptor N–1). A prefetch count indicates how many descriptors released to the packet manager are already fetched. When there is no space in the prefetch buffer or when the "count"=the "prefetch count," the packet manager will stop prefetching. When a descriptor is used, both the "count" and the "prefetch count" registers are decremented. The descriptors may be used in a ring. That is, descriptors may be used in consecutive order starting at descriptor 0 and proceeding to descriptor N–1. When the last descriptor N–1 has been used, the next descriptor to be used is descriptor 0 (indicated in FIG. 6 by the dashed line from descriptor N–1 to descriptor 0).

Each descriptor points to a memory buffer (that is, the descriptor includes the address of the memory buffer), and may also include various attributes of the memory buffer. For example, in FIG. 6, the descriptor 602A points to the memory buffer 604A and the descriptor 602B points to the memory buffer 604B.

The descriptors are made available to the packet manager circuit 516 by software. Once the packet manager circuit 516 has used a descriptor to store a packet (or reads the packet from the descriptor for transmission), the packet manager circuit 516 returns the descriptor to software. In one embodiment, the packet manager circuit 516 returns a descriptor to software by resetting a hardware (HW) bit in the descriptor, described in more detail below. Software sets up the descriptors in the descriptor ring, and writes the number of descriptors being made available to the count corresponding to that descriptor ring ("count" field in the registers 610 in FIG. 6). The value written to the count field is added by the control circuit 584 to the value in the count field, resulting in the count of available descriptors. The "last" field in the registers 610 in FIG. 6 is an index, measured from the base address, to the last descriptor that was used by the packet manager circuit 516 and returned to software. Thus, the descriptors beginning with the next descriptor in the ring after the descriptor indicated by the "last" field and the following "count"–1 number of descriptors are available for packet manager circuit use.

In one embodiment, the packet manager circuit 516 may prefetch one or more descriptors. The "prefetch" field of the registers 610 indicates the index, measured from the base address, of the most recently prefetched descriptor. Thus, the next descriptor to be prefetched may be the descriptor in the ring which follows the descriptor indicated by the prefetch index. Alternatively, the prefetch index may indicate the next descriptor to be prefetched. In one embodiment, the packet manager circuit 516 does not attempt to prefetch a descriptor which has not been made available by software and thus the prefetch index may generally indicate a descriptor between the "last" descriptor and the descriptor corresponding to the "last" index plus the "count."

Figure 7:
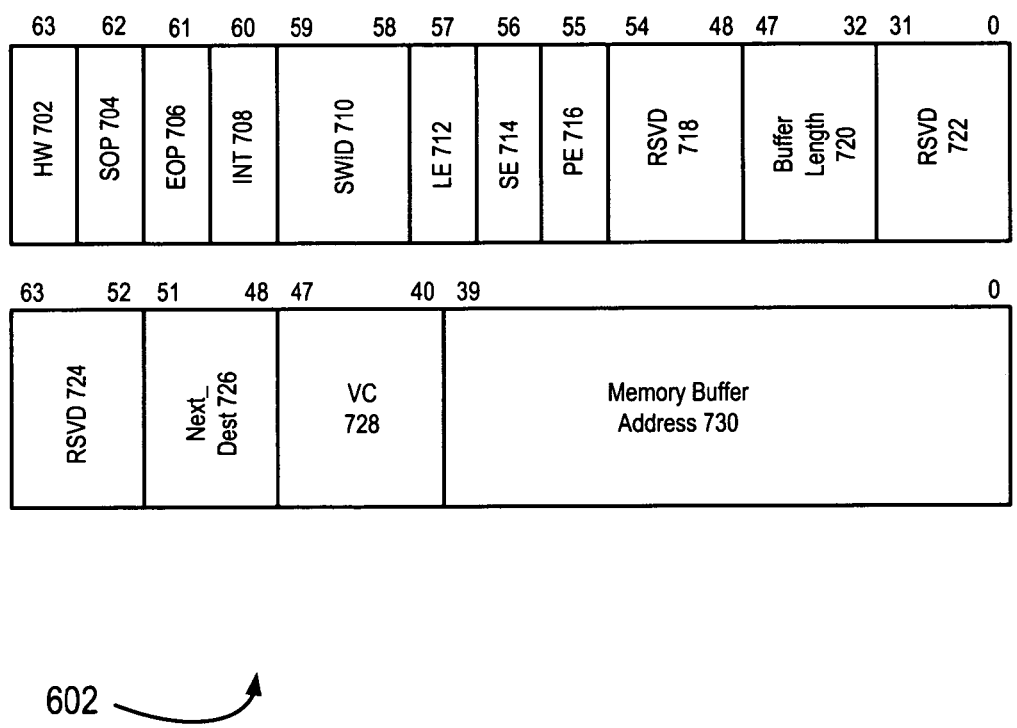
FIG. 7 is a block diagram of one embodiment of a descriptor.

FIG. 7 is a block diagram of one embodiment of a descriptor 602. In the embodiment of FIG. 7, the descriptor comprises 16 bytes illustrated as two 8 byte words. The bit ranges for the fields within each 8 bytes are shown above the fields. Fields labeled RSVD 718, 722, 724 are reserved.

The descriptor 602 includes a variety of status information stored in bits 63:55 of the first 8 byte word. In particular, a hardware bit (HW) 702 is included. Software may set the HW bit 702 to indicate that the descriptor 602 is available for packet manager circuit 516 use. The packet manager circuit 516 may clear the HW bit to return the descriptor to software.

The SOP 704 and EOP 706 bits are used to indicate whether the memory buffer corresponding to the descriptor includes the start of the packet or the end of the packet. A packet may be stored in one or more memory buffers. If the memory buffer located by the descriptor 602 includes the start of a packet, the SOP bit 704 is set. Otherwise, the SOP bit is clear. If the memory buffer includes the end of the packet, the EOP bit 706 is set. Otherwise, the EOP bit is clear. Thus, if a packet is stored in one memory buffer, both the EOP and SOP bits in that descriptor are set. If a packet is stored in more than one memory buffer, the SOP bit 704 in the descriptor corresponding to the first memory buffer is set and the EOP bit 706 in the descriptor corresponding to the last memory buffer is set. EOP and SOP bits in other descriptors are clear. For input queue descriptors, the control circuit 584 sets or clears the EOP and SOP bits when writing the updated descriptor back to memory after writing packet data into the memory buffer. For output queue descriptors, software sets or clears the EOP and SOP bits when generating the descriptors for the packets. In some embodiments, having both the EOP and SOP bits 704, 706 in the descriptors may reduce traffic when packet processing is performed by multiple processors. For example, if the processor searches backward in the descriptor ring to find a packet to process, the SOP bit indicates that the start of a packet has been found, eliminating another read to find the EOP bit in the preceding descriptor is set.

The INT bit 708 is used to indicate if the packet manager circuit 516 is to generate an interrupt when the descriptor is complete (e.g., when the packet manager circuit 516 is writing the updated descriptor back to memory). Software may set the INT bit to cause the interrupt and clear the INT bit to not cause the interrupt.

The SWID field 710 may indicate the interface circuit (e.g., the receiver interface circuit) on which the packet was received, for input queue descriptors. The LE bit 712 may indicate, when set, that an error was encountered in the receiver interface circuit that received the packet. In particular, if the receive circuit is receiving SPI-4 phase 2 traffic, the LE bit may indicate, when set, that a DIP-4 error occurred. The SE bit 714 may indicate, when set, that a SPI-4 abort control word was received in the packet or an error was detected in a PoHT transaction. The PE bit 716 may indicate, when set, that the packet manager circuit detected an error when transferring the packet.

The buffer length field 720 indicates the size of the memory buffer indicated by the descriptor 602 (in bytes). For input queue descriptors, the control circuit 584 may overwrite the buffer length field to indicate the actual length used to store packet data.

The next_dest field 726 in the descriptor is used, for output queue descriptors, to store the next_dest value for PoHT packets. The control circuit 590 may read the next_dest field and transmit the value with the packet to the transmit interface circuit that is to transmit the packet.

The VC field 728 stores the IVC for a received packet, if the packet was transmitted on the SPI interface. For output queue descriptors, the VC field may store a value for which the most significant 4 bits are transmitted to the transmit interface circuit to transmit the packet, and the transmit interface circuit may append the bits to the OVC to generate the VC field in the SPI-4 packet. The memory buffer address field 730 stores the address of the memory buffer indicated by the descriptor 602.

It is noted that, while various bits have been described above as having certain meanings when set or clear, the opposite meanings may be assigned to the set and clear states. Generally, any indication may be used in various embodiments.

Figure 8:
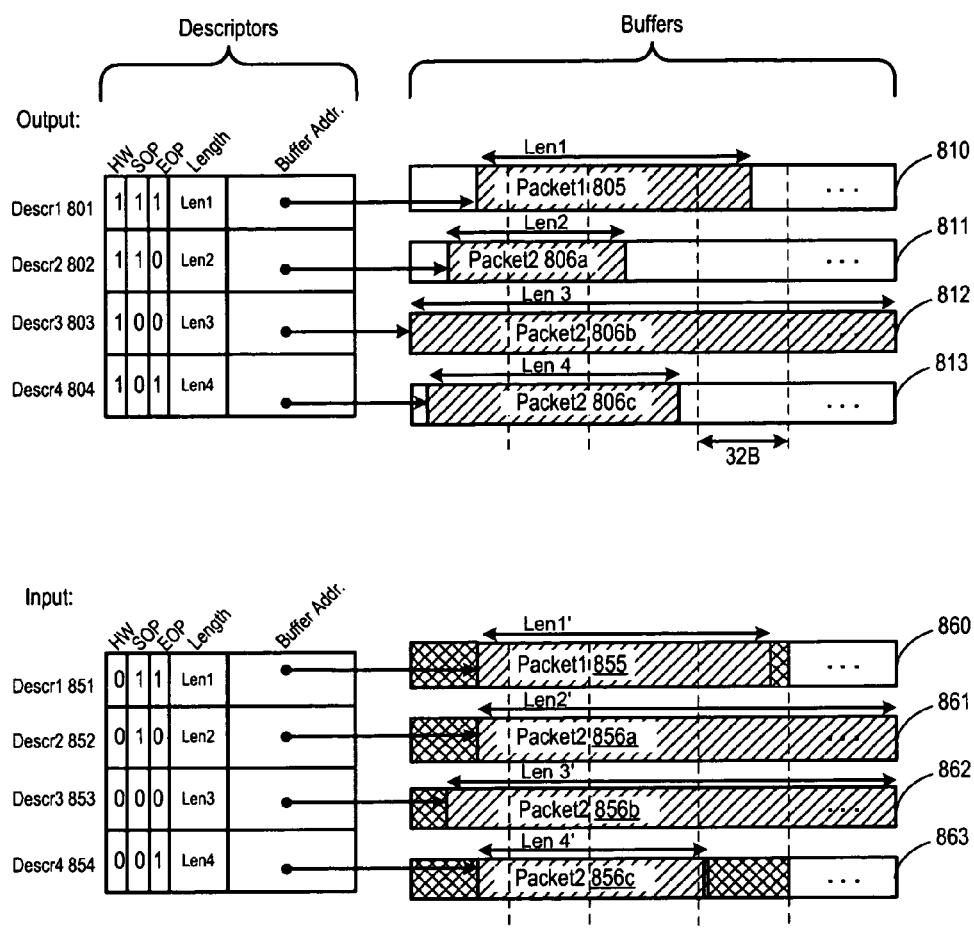
FIG. 8 illustrates an example of input and output packets represented with single and multiple descriptors.

Turning now to FIG. 8, the transfer of two packets (Packet1 and Packet2) using single and multiple descriptors is illustrated for both the PMI 322 and PMO 324. Descriptors 801–804 represent an output queue ready for transmission, as indicated by the hardware bits (HW) being set to "1." Descriptors 851–854 represent an input queue that the packet manager 320 has just written to memory (e.g., memory 340 or cache memory 118), as indicated by the hardware bits (HW) being set to "0." For both input and output packets, the first packet (e.g., first output packet 805) is small enough to fit in a single descriptor (e.g., 801). With such packets, the output descriptor (Descr1 801) has the SOP and EOP bits set. Likewise, the input descriptor (e.g., Descr1 851) has both its SOP and EOP bits set. In the input queue, the length field (Len1) of the first descriptor (Descr1 851) is updated with the correct packet length (Len1') after the packet is received by packet manager 320.

As illustrated, the long packet (Packet2) spans multiple descriptors. For example, in the input queue, the long packet 856 spans three descriptors 852, 853, 854. The first descriptor (Desc2) 851 for this packet points to the start of the packet (Packet2) with its buffer address field, and in addition, its SOP bit is set. In the output queue, the SOP bit of descriptor 802 is set, or may be impliedly set if the previous descriptor had its EOP bit set. As a packet is being received, the length field of the descriptor (e.g., Desc2 852) will be used by the packet manager to determine how much more space is left in the buffer 861. When the buffer 861 is filled, the next descriptor 853 is used to continue to fill the packet, and this is repeated with the remaining descriptors 853, 854. The total length of Packet2 856 is determined by the software by adding up the length fields (Len2', Len3', Len4') of each descriptor (Descr2, Descr3, and Descr4).

In operation, once a descriptor is prefetched by the PMI 322, packet reception begins when the top descriptor (e.g., Desc1 851) is fetched from the prefetch descriptor buffer 586. The PMI 322 uses the start buffer address (730) in the descriptor (e.g., Descr1 851) to determine where to write the received data in the memory. The length field (720) is used to determine how much data to write into a specific buffer (e.g., 860). The PMI 322 writes into the buffer until either the end of the packet is observed or the buffer is full. If one of these conditions occurs, the descriptor is updated and written back. For example, if this was the start of the packet, the PMI 322 writes a "1" to the SOP bit 704 of the descriptor. If this was the end of the packet, the PMI 322 writes a "1" to the EOP bit 706 of the descriptor. The length field 720 is then overwritten with the actual length (Len1') of buffer used. The error bit(s) (712, 714, 716) are then set in the last descriptor of the packet if there was an error in the receive port or at the source or in the packet manager 320. The PMI 322 then writes a zero to the hardware bit 792 to change ownership of the descriptor to software.

In connection with the packet manager example of using descriptors described above, the packet manager 516 can inform the software of the descriptor release by interrupting a processor when one or more packets are received in memory. This is referred to as a "completion interrupt." For example, the packet manager may include a packet counter that is used to generate an interrupt after transferring a configurable number of packets. This is of most use in the receive channel. If the interrupt count is set to "1," then an interrupt will be raised after every packet. Since this can swamp the system with interrupts, the count would typically be set higher and the receive interrupt service routine will be written to accept a batch of packets. However, in order to avoid imposing a high delay before packets are serviced when they are arriving at a low rate, the interrupt can also be raised by an interrupt timer 530. Timer 530 is programmable so that it starts counting when the first packet reception is complete and will increment at a predetermined rate (such as controlled by the CPU clocks). If the interrupt has not been raised because the packet count threshold has not been reached, the interrupt will be forced when the timer 530 has counted to a programmed limit. The completion interrupts are also available for transmit interfaces. In this case, the counter will increment when a packet transmission has completed, and the timer 530 will start running when the first transmission has completed or at some other predetermined event during data transmission. This could be used to detect the transmitter being unable to send for an unacceptably long period. In a selected embodiment, the interrupt timer and packet counter are cleared by the processor when it reads an interrupt status register for the channel, thereby disabling the timer and zeroing the received packet count to prepare the system for the next batch of packets.

In like fashion, descriptor-based packet manager transfers can also use the timer 530 implemented as a descriptor timer to improve memory read and write operations. For example, write operation bandwidth can be increased by writing a full cache line width using two (or more) descriptors' worth of data using a write-invalidate command, which is much quicker than using a read-modify-write command for writing less than a full cache line. For example, the write invalidate command invalidates any cache lines holding copies of the descriptor, and returns ownership of the cache line to the L2 cache 118 and memory system 125 (the default owner). To take advantage of this property of write-invalidate commands, the packet manager input 540 will release descriptors by increments of two to reduce descriptor bandwidth. To promote full cache line transfers, timer 530 is set after the first descriptor in a cache line is ready to be released to the software. If the other descriptor in the same cache line is finished before the timer 530 expires, both descriptors will be released together with a write-invalidate command on the bus 130. If the timer 530 expires, then both descriptors will be written back one by one with read-modify-write commands (read-exclusive followed by write) when they are ready to be released. The descriptor write back mechanism can be implemented by the structures disclosed in copending U.S. patent application entitled "Descriptor Write Back Delay Mechanism To Improve Performance" by K. Oner, Ser. No. 10/685,137, filed Oct. 14, 2003, and assigned to Broadcom Corporation, which is also the assignee of the present application, and is hereby incorporated by reference in its entirety.

While multiple individual counter circuits could be used to implement the interrupt and descriptor timers for multiple channels (e.g., 64 virtual channels), such a solution would consume valuable chip area and would increase the system complexity, especially where independent and different time-out settings are required for multiple channels. Accordingly, an exponential channelized timer is advantageously used in connection with multi-channel, multiprocessor applications such as depicted in FIGS. 3–5 to efficiently provide a programmable timer with individual time-out settings for multiple channels. In a selected embodiment, an exponential channelized timer monitors a selected bit position of a free-running timer and generates a pulse whenever a transition is observed at that bit location. In this embodiment, the time-out values that can be set are exponential values (power of 2), so the exponential channelized timer acts as an interval timer where the timer accuracy goes down as the interval increases. For example, if an exponential channelized timer for a particular channel is programmed to monitor bit location number five of a free running 32-bit counter, then the time-out will be generated within a time interval of 32 ($2^5$) and 63 ($2^6-1$), reflecting the fact that the free running timer is not reset with each packet. As will be appreciated, this interval increases exponentially as the monitored bit location register becomes more significant. Therefore, the timer gets less accurate as this value is increased. However, by using multiplexers and control registers for each channel, the exponential timer can be used to generate time-outs for multiple channels without requiring long timer counters for each channel, using only a single free running counter. The timer module 375 can be implemented by the structures disclosed in copending U.S. patent application entitled "Exponential Channelized Timer" by K. Oner, Ser. No. 10/684,916, filed Oct. 14, 2003, and assigned to Broadcom Corporation, which is also the assignee of the present application, and is hereby incorporated by reference in its entirety.

As described above, there are at least two ways for the software to find out that new packets have arrived, including spinning on the descriptors and checking whether their hardware bits are reset, and waiting for the packet manager to interrupt the processor. In addition, the processor can read the descriptor control register to check on the status of the data transfer. When descriptor spinning is used, the software will spin on the descriptors that it has released to the packet manager 320. When descriptors are loaded as shared by the spinning processors, no additional bus traffic is generated on the bus 130 after the initial read. In particular, the packet manager 320 may release a descriptor by writing the descriptor to the memory with either a write invalidate or read-exclusive and write command, at which time the spinning processor's cached copy will be invalidated, and only then it will fetch the updated descriptor. The software can check the hardware bit 702 to determine if this descriptor is done or not. In a selected embodiment, the descriptor is done if the hardware bit 702 is reset. As a result, the work of processing the received packets can be dispatched to each processor 342–345 in groups of descriptors. By having the packet manager 320 release all of the descriptors in order, each processor can spin on the last descriptor it owns, and when the software detects that the last descriptor it owns is done, it can assume that all the previous descriptors are done as well.

In accordance with the present invention, the descriptor structure has additional descriptor fields specifying descriptor ownership and whether the descriptor is for the start or end of the packet. With these fields, the first descriptor can separately specify descriptor ownership (with the HW bit 702) and whether the descriptor is for the start of packet (with the SOP bit 704). In addition, an end-of-packet indicator (EOP bit 706) is used to specify when the descriptor's buffer contains the end of the packet. As a result, a whole packet can be specified by a single descriptor (in which case both the SOP and EOP bits are set, such as with descriptor 851) or by multiple descriptors (in which case the first descriptor, e.g., 852, has its SOP bit set, the last descriptor, e.g., 854, has its EOP bit set, and any middle descriptors, e.g., 853, have neither the EOP or SOP bits set).

An additional feature of the descriptor structure described herein is that, rather than recording the keeping the full packet length in the first descriptor, each descriptor keeps tract of how many bytes of data are used in the buffer pointed by that descriptor. While the full packet length must be determined by the software summing all the length fields of each descriptor in a packet, this approach removes the upper limit on the length of a packet since each packet can be composed of multiple and unlimited number of descriptors.

By including these additional descriptor fields in all of the descriptors that are written back to memory, packet processing of a channel can be efficiently and quickly distributed between several processors. In particular, after creating and releasing a group of descriptors, the software assigns consecutive groups of descriptors to different processors, each of which then uses the additional descriptor fields to identify the descriptors needed to complete the packet for which the processor was assigned responsibility. This is illustrated in FIG. 9, which illustrates the assignment and processing of a plurality of descriptors 900–920, where some of the descriptors are controlled by software (e.g., descriptors 900, which has its HW bit set to "0") and others have been released to the packet manager (e.g., descriptors 902–917, which have the HW bits set to "1"). After creating and releasing a group of descriptors (e.g., descriptors 902–917), each processor is assigned a consecutive group of descriptors. For example, a first processor (CPU0) is assigned descriptors 902–905, a second processor (CPU1) is assigned the next consecutive group of descriptors 906–909, and so on until the released descriptors have all been assigned to a processor. Each processor snoops the last descriptor assigned to it (e.g., the first processor snoops descriptor 905). When this descriptor is written back by the packet manager with the HW bit reset, it means that all of the previous assigned descriptors (902–904) are also written back since the packet manager is configured to write the descriptors back in order. The processor then starts scanning all of its assigned descriptors, starting from the last one, to claim ownership of any descriptors needed to complete a packet that the processor has been assigned to work on. In a selected embodiment, processor is responsible for all packets (the "targeted packets") whose EOP descriptor has been assigned to that processor, and the processor will process all descriptors for which it claims ownership. In other words, the processor will process all descriptors corresponding to the targeted packets for that processor. This is illustrated in FIG. 9, where the first processor (CPU0) is assigned descriptors 902–905. By scanning these descriptors, the first processor determines that it has been assigned EOP descriptors 903 and 905 (shown as corresponding to Packet 0 and Packet 1). The first processor then claims ownership of the previous descriptors (902 and 904, respectively) required to complete these two packets, and begins processing the descriptors (902–905) corresponding to its assigned packets (Packet 0 and Packet 1).

When preliminary descriptor assignments are made to the processors, the assigned descriptors will not necessarily contain all of the descriptors required for the targeted packets. This is illustrated in FIG. 9 with the descriptors assigned to the third processor (CPU2), where EOP descriptor 911 belongs to the third processor, but that packet's SOP descriptor 909 was assigned to the second processor (CPU2). To address this, each processor (e.g., CPU2) will continue to read the previous descriptors (910, 909) until it finds the SOP descriptor (909), and will then claim ownership of these previous descriptors (909–911) so that the processor can process the packet (Packet 3) defined by all the descriptors including these SOP and EOP descriptors.

In accordance with this technique, a group of descriptors (902–917) are distributed among four processors (CPU0, CPU1, CPU2, CPU3). As illustrated in FIG. 9, each processor is assigned four descriptors to work on. The HW, SOP, and EOP bits in the descriptors show which descriptors are finished (HW bit) and which descriptors the packets span (SOP and EOP). In the depicted example, six packets are fully received and a seventh packet is partially received. The initial processor assignments are shown in the "Assigned" column. By using the EOP bits to identify targeted packets and the SOP bits to claim descriptor ownership for the targeted packets, descriptors for the received packets are mapped to the processors who work on each packet is shown in the last "Working" column. Thus, each processor snoops or spins on its last assigned descriptor so that when that descriptor is finished, the processor can then determine descriptor ownership and start processing all of the descriptors/packets that are assigned to them. Since each processor works in parallel with each other, the packet processing workload will be distributed among all the available processors.

Figure 10:
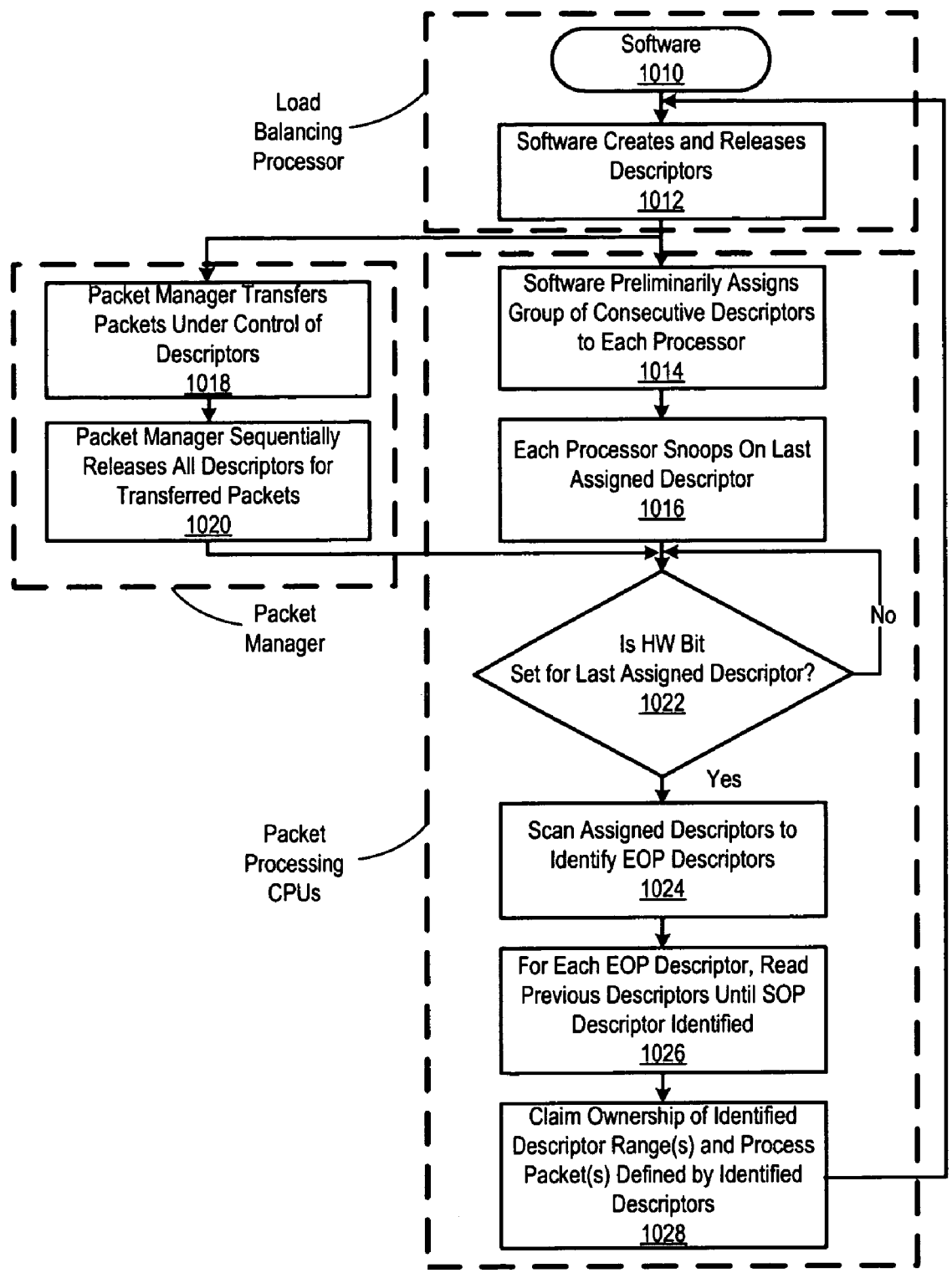
FIG. 10 is a flowchart illustrating operation of selected embodiments of the descriptor-based load balancing operation of the present invention implemented as part of an input packet manager circuit.

Turning next to FIG. 10, a flowchart is shown illustrating operation of one embodiment of the descriptor-based packet allocation technique of the present invention such as could be implemented, for example, by a CPU (e.g., SB-1 343) in connection with processing packets that are received and stored by PMI 322. Other CPUs (e.g., SB-1 344, 345) could perform similar operations in parallel under control of a load balancing processor (e.g., SB-1 342) that runs load balancing software. The blocks shown in FIG. 10 are illustrated in a particular order for ease of understanding, but any order may be used. Furthermore, the flowchart may represent the operation of the multiprocessor device over a number of clock cycles.

As described herein, load balancing function may be run in software (block 1010) which runs on one of the processors which handles the preliminary load balancing descriptor assignments. In particular, after creating and releasing a group of descriptors (block 1012), the software assigns consecutive groups of these descriptors to different processors by making preliminary descriptor assignments (block 1014). This preliminary distribution of descriptors is done on an ongoing basis before any packets are received and it is done by software. The distribution of descriptors continues as packets are received and processed whereby descriptors that are released after buffer transfers are re-used by reassigning them to new processors, and so on in a loop. The packet manager processes the released descriptors to transfer received packets of data into memory (block 1018). After transferring one or more packets, the packet manager releases in order all of the descriptors used to transfer the packet(s) (block 1020). During or after the packet transfer operation, each processor snoops the last descriptor assigned to it (block 1016). When this descriptor is written back by the packet manager (block 1022), all of the previous descriptors have also been written back (block 1020). Accordingly, the processor can begin scanning all of its assigned descriptors, starting from the last one, to identify the packets whose EOP descriptor is in the assigned set of descriptors, and the descriptors corresponding to the identified packets are claimed by the processor so that processor will process those packets.

In a selected embodiment, if an EOP descriptor belongs to a processor (block 1024), the processor reads the previous descriptors until an SOP descriptor is identified (block 1026). The processor then claims ownership of the identified SOP and EOP descriptors (and any descriptors in between these descriptors), and then processes the packet defined by these descriptors (block 1028). If, upon reading previous descriptors to identify the SOP descriptor, the SOP descriptor was not preliminarily assigned to the processor, this processor will continue to read the previous descriptors until it finds the SOP descriptor, even if this requires the processor to claim ownership over a descriptor that was preliminarily assigned to another processor (at block 1014).

As will be appreciated, the present invention may be implemented in a computer accessible medium including one or more data structures representative of the circuitry included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, etc., as well as media accessible via transmission media or signals such as electrical, electromagnetic, or digital signals, conveyed via a communication medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the multiprocessor system and/or the interrupt mapping circuitry (e.g., processors, memory controller, bus, packet manager circuit (or portions thereof), switch, receive/transmit interface circuits (or portions thereof), etc.).

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. An integrated circuit multiprocessor apparatus for processing a plurality of data packets, comprising:
   a plurality of processors;
   an interface circuit for receiving and transmitting a plurality of data packets;
   a memory comprising a plurality of descriptors, each of said plurality of descriptors comprising an ownership indication, a start of packet indication, an end of packet indication, a buffer length value and a buffer address for specifying a location of a buffer in memory for storing at least a portion of a data packet;
   a packet manager circuit coupled between the interface circuit and the memory to transfer data packets between the interface circuit and memory, wherein the packet manager circuit is configured to transfer a first data packet under control of at least a first descriptor and to transfer a second data packet under control of at least a second descriptor, wherein said packet manager is configured to write back to memory all descriptors associated with a data packet upon completion of the transfer of said data packet and said descriptors are written back in the order in which they are released.

2. The apparatus recited in claim 1, wherein the each data packet is associated with a descriptor ring comprising a plurality of descriptors, each of the plurality of descriptors identifying a memory buffer in the memory for storing at least a portion of a data packet.

3. The apparatus recited in claim 1, wherein the packet manager circuit comprises a packet manager input circuit coupled between the interface circuit and the memory to transfer data packets from the interface circuit to memory, wherein the packet manager input is configured to transfer a first data packet to memory only after the at least a first descriptor is read that has its ownership indication set.

4. The apparatus recited in claim 1, wherein said packet manager is configured to reset the ownership indication in each descriptor after completing transfer of data under said descriptor.

5. The apparatus recited in claim 1, wherein the at least a first descriptor comprises:
   a start descriptor having its start of packet indication set, where said start descriptor identifies a memory buffer where the start of the first data packet is stored; and
   a last descriptor having its end of packet indication set, where said last descriptor identifies a memory buffer where the end of the first data packet is stored.

6. The apparatus recited in claim 5, wherein the at least a first descriptor comprises at least one middle descriptor having both its start of packet indication and end of packet indication reset.

7. The apparatus recited in claim 1, wherein the at least a first descriptor has its start of packet indication and end of packet indication set.

8. The apparatus recited in claim 1, further comprising a load balancing processor for distributing the plurality of data packets to the plurality of processors for processing by assigning a first consecutive group of the plurality of descriptors to a first processor and a second consecutive group of the plurality of descriptors to a second processor, wherein the first processor snoops on a last descriptor in the first consecutive group of descriptors for said first processor to detect when the last descriptor has its ownership indication reset by the packet manager circuit.

9. The apparatus recited in claim 8, wherein the first processor processes at least a first claimed data packet by scanning back through the first consecutive group of descriptors, starting with the last descriptor having its ownership indication reset, to identify any descriptor having an end of packet indication set, and then scanning back further through the first consecutive group of descriptors to identify any packet start descriptor having a start of packet indication set, said at least first claimed data packet comprising the packet start descriptor and the last descriptor.

10. The apparatus recited in claim 9, wherein the first processor processes a claimed data packet by further scanning back through the plurality of descriptors to identify a packet start descriptor if said packet start descriptor is not included in the first consecutive group of descriptors assigned to the first processor.

11. A system for controlling distribution of a plurality of data packets to a plurality of processors, said system comprising:
   a plurality of consecutive descriptor entries;
   a DMA controller for reading the plurality of consecutive descriptor entries; storing data packets in a plurality of buffers, each of the plurality of consecutive descriptor entries specifying a buffer for storing at least a portion of a data packet; and releasing ownership of the plurality of consecutive descriptor entries in order upon completing storage of a data packet;
   a plurality of processors, each processor configured to process packets; and
   an assignment processor for assigning a first group of descriptors from the plurality of consecutive descriptor entries to a first processor and for assigning a second group of descriptors from the plurality of consecutive descriptor entries to a second processor;
   where each processor in the plurality of processors is configured to spin on the final descriptor in its assigned group of descriptors and to process any packet comprising any EOP descriptors contained with its assigned group of descriptors along with any other descriptors associated with each EOP descriptor.

12. The system recited in claim 11, wherein each of said plurality of consecutive descriptor entries comprises an ownership indication, a start of packet indication, an end of packet indication, a buffer length value and a buffer address for specifying a location of a buffer in memory for storing at least a portion of a data packet.

13. The system recited in claim 12, wherein an EOP descriptor comprises a descriptor entry having an end of packet indication set.

14. The system recited in claim 11, wherein the descriptors associated with each EOP descriptor are determined by scanning back through the assigned group of descriptors to identify an SOP descriptor.

15. The system recited in claim 11, wherein the descriptors associated with each EOP descriptor are determined by scanning back through the plurality of consecutive descriptor entries, starting with its assigned group of descriptors, to identify an SOP descriptor if said an SOP descriptor is not included in the assigned group of descriptors for said processor.

16. The system recited in claim 12, wherein each processor in the plurality of processors determines the length of an assigned packet by summing the buffer length values for each descriptor associated with the assigned packet so as to support an unlimited packet size.

17. A method comprising:
    creating and releasing a plurality of descriptors to a packet manager, said plurality of descriptors comprising a first descriptor group and a second descriptor group;
    assigning a first subset of the plurality of descriptors to a first processor and a second subset of the plurality of descriptors to a second processor;
    receiving a first packet in an interface circuit and transferring the first packet to at least a first memory buffer under control of the first descriptor group;
    receiving a second packet in the interface circuit and transferring the second packet to at least a second memory buffer under control of the second descriptor group;
    releasing the first descriptor group to software by writing the first descriptor group to memory;
    releasing the second descriptor group to software by writing the second descriptor group to memory; and
    at each processor, identifying any EOP descriptor in the assigned subset of the plurality of descriptors and processing any descriptor associated with said EOP descriptor.

18. The method recited in claim 17, wherein each processor identifies any EOP descriptor in the subset of the plurality of descriptors assigned to said processor by snooping on a last descriptor from the assigned subset of the plurality of descriptors and scanning back through said assigned subset of the plurality of descriptors to identify any EOP descriptor and any descriptor associated with said EOP descriptor.

19. The method recited in claim 18, wherein any descriptor associated with said EOP descriptor comprises said identified EOP descriptor and SOP descriptor.

20. The method of claim 17, wherein said first descriptor group comprises at least one descriptor, where said at least one descriptor comprises an ownership bit, a start of packet bit, an end of packet bit, a buffer length value and a buffer address for specifying a location of a buffer in memory for storing at least a portion of a data packet.

21. The method of claim 17, wherein a processor identifies a first descriptor as an EOP descriptor by checking to see if an EOP bit is set in the first descriptor.

22. The method of claim 17, wherein a processor identifies a first descriptor as an SOP descriptor by checking to see if an SOP bit is set in the first descriptor.

23. The method of claim 17, wherein a processor determines that a first descriptor contains an entire packet by checking to see if both and SOP bit and an EOP bit are set in the first descriptor.

* * * * *